United States Patent [19]
Wang et al.

[11] Patent Number: 5,275,732
[45] Date of Patent: Jan. 4, 1994

[54] COMBINED COARSE AND FINE BUBBLE SEPARATION SYSTEM

[75] Inventors: Lawrence K. Wang, Latham, N.Y.; Lubomyr Kurylko, North Port, Fla.; Mu Hao S. Wang, Latham, N.Y.

[73] Assignee: International Environmental Systems, Inc., USA, Latham, N.Y.

[21] Appl. No.: 984,319

[22] Filed: Dec. 2, 1992

Related U.S. Application Data

[63] Continuation-in-part of Ser. No. 708,777, May 29, 1991, Pat. No. 5,167,806, Ser. No. 550,515, Jul. 10, 1990, and Ser. No. 551,543, Jul. 11, 1990, said Ser. No. 708,777, is a continuation-in-part of Ser. No. 547,982, Jul. 3, 1990, Pat. No. 5,049,320.

[51] Int. Cl.$^5$ .................. C02F 1/24; C02F 1/20; C02F 3/02; C02F 9/00
[52] U.S. Cl. .................. 210/601; 210/603; 210/608; 210/632; 210/622; 210/624; 210/703; 210/707; 210/747; 210/908; 210/188; 210/221.2; 210/256; 210/748
[58] Field of Search .................. 210/221.2, 188, 221.1, 210/256, 202, 260, 207, 703, 704, 705, 706, 707, 622, 631, 620, 709, 739, 632, 601, 608, 603, 624, 747, 908, 748

[56] References Cited

U.S. PATENT DOCUMENTS

| | | | |
|---|---|---|---|
| 3,428,175 | 2/1969 | Hukki | 209/164 |
| 3,479,281 | 11/1969 | Kikindai | 210/703 |
| 3,523,891 | 8/1970 | Mehl | 210/202 |
| 3,959,131 | 5/1976 | Ramirez | 210/221.1 |
| 4,022,696 | 5/1977 | Krofta | 210/520 |
| 4,031,006 | 6/1977 | Ramirez | 210/221.2 |
| 4,101,409 | 7/1978 | Austin | 204/152 |
| 4,203,837 | 5/1980 | Hoge | 210/705 |
| 4,735,709 | 4/1988 | Zipperian | 261/76 |
| 4,737,272 | 4/1988 | Szatkowski | 210/703 |
| 4,872,997 | 10/1989 | Becker | 210/202 |
| 5,049,320 | 9/1991 | Wang | 261/122 |
| 5,064,531 | 11/1991 | Wang | 210/202 |
| 5,068,031 | 11/1991 | Wang | 210/202 |
| 5,069,783 | 12/1991 | Wang | 210/202 |
| 5,084,165 | 1/1992 | Wang | 210/202 |
| 5,116,487 | 5/1992 | Parekh | 209/164 |
| 5,167,806 | 12/1992 | Wang | 210/202 |
| 5,182,014 | 1/1993 | Goodman | 204/277 |

FOREIGN PATENT DOCUMENTS

| | | | |
|---|---|---|---|
| 1227894 | 10/1986 | Japan | 210/294 |
| 1361117 | 12/1987 | U.S.S.R. | 210/202 |

OTHER PUBLICATIONS

M. Krofta & L. K. Wang, Potable Water Treatment by Dissolved Air Flotation and Filtration, Journal American Water Works Association, vol. 74, No. 6, pp. 304–310, Jun. 1982.

L. K. Wang, Theory and Applications of Flotation Processes, U.S. Department of Commerce, NTIS, Springfield, Va. Report No. PB86-194198/AS, 15 pages, Nov. 1985.

L. K. Wang, Design and Specifications of Pittsfield Water Treatment Systems Consisting of Air Flotation, and Sand Filtration, Water Treatment, vol. 6, No. 2, pp. 127–146, Apr. 1991.

L. K. Wang, Reduction of Color, Odor, Humic Acid, and Toxic Substances by Adsorption, Flotation and Filtration, Water Treatment, vol. 7, No. 1, pp. 1–16, Jan. 1992.

Primary Examiner—Thomas M. Lithgow

[57] ABSTRACT

A high rate multi-stage bubble separation process is developed for: (a) initially generating coarse gas bubbles with diameters greater than 80 microns in turbulent hydraulic condition to mix an influent water with chemicals, enzymes, microorganisms, or combinations thereof, to produce chemical flocs, biological flocs or both, and to strip volatile contaminants from water; (b) subsequently terminating coarse gas bubbles and generating extremely fine gas bubbles with diameters smaller than 80 microns in laminar hydraulic condition to float suspended, oily and surface-active contaminants together with said chemical flocs and said biological flocs from water, to settle heavy contaminants from water, and to produce a clarified effluent water, a floating scum, and a sludge; (c) terminating the fine gas bubbles and discharging the clarified effluent water; (d) discharging the floating scum and the sludge upon demand; and (e) optionally collecting and treating an emitted gas stream resulting from said coarse gas bubbles and said fine gas bubbles.

8 Claims, 9 Drawing Sheets

COMBINED COARSE AND FINE BUBBLE SEPARATION SYSTEM

This application is a continuation-in-part of three U.S. Pat. applications: (a) Ser. No. 07/708777, filed May 29, 1991, U.S. Pat. No. 5,167,806, which is in turn a continuation-in-part of application Ser. No. 07/547982, filed Jul. 3, 1990, now awarded as U.S. Pat. No. 5,049,320 on Sept. 17, 1991; (b) Ser. No. 07/550515, filed Jul. 10, 1990, now pending; and (c) Ser. No. 07/551543, filed Jul. 11, 1990, now pending.

BACKGROUND OF THE INVENTION

1. Field of the Invention

The present invention relates to a bubble separation and an apparatus thereof comprising: (a) a coarse e bubble chamber for generation of coarse gas bubbles with diameters much greater than 80 microns (generally greater than 250 microns) for complete mixing and gas stripping, and (b) a fine bubble chamber for subsequently generation of fine gas bubbles with diameters much smaller than 80 microns, in turn, for flotation clarification of suspended and surface active matters in a water stream. The present invention also relates to chemical treatment, biological treatment, electrolysis, and air emission control. Both continuous bubble separation system and batch bubble separation system are developed.

2. Description of the Prior Art

Various adsorptive bubble separation processes including dissolved air flotation, vacuum flotation, dispersed air flotation, electroflotation, biological flotation, etc. have been attempted by environmental engineers for water and waste water treatment, with various degrees of success.

Dissolved air flotation is an innovative adsorptive bubble separation process, in which extremely fine air bubbles (with diameters less than 80 microns) are required for separation of mainly insoluble suspended solids from an original liquid phase into a thickened scum phase on the liquid surface. The ratio of air volume to liquid volume is only about 1 to 3 percent. In operation, the gas, such as air, is initially dissolved into water under high pressure, thereby producing a pressurized water. By reduction of pressure in stages, the supersaturated dissolved gas in the pressurized water is subsequently released into a water stream under one atmospheric pressure for production of extremely fine gas bubbles.

Diffused air flotation, dispersed air flotation, froth flotation, and foam separation are all conventional adsorptive bubble separation processes, in which coarse air bubbles (with a diameter much greater than 250 microns) are generated under nearly atmospheric pressure in a liquid-gas mixing vessel. A swarm of coarse air bubbles amounting to 400 percent of the liquid's volumetric flow creates turbulence in the liquid stream, and also provides a large air-to-liquid interface area that allows soluble surface active substances to be adsorbed on the air bubbles, and be separated from the original liquid phase, thereby forming a foam or froth phase on the liquid surface.

A vacuum flotation clarifier needs an enclosure over the top, and is connected to a vacuum pump. Under vacuum (i.e. negative pressure) condition inside said enclosure, the gases originally in soluble form in a water stream held by said vacuum flotation clarifier now become extremely fine gas bubbles with diameters smaller than 80 microns. At present, vacuum flotation clarification is not practiced by environmental engineers for water purification or groundwater decontamination due to poor designs and high costs of old vacuum floatation installations.

Electroflotation is another innovative adsorptive bubble separation process in which an anode electrode and a cathode electrode are used as a pair for generation of fine gas bubbles (with diameters smaller than 80 microns) in a water stream held by an electroflotation clarifier in the presence of electrolytes (i.e. ionic minerals) in water.

Biological flotation's theory and principles are presented by Lawrence K. Wang in his report "Theory and Applications of Flotation Processes" (U.S. Dept. of Commerce, National Technical Information Service, Springfield, Va., U.S.A.; Report No. PB86-194198/AS; November 1985). Under anaerobic conditions and in the presence of anaerobic and facultative microorganisms and nitrate ions, extremely fine nitrogen and carbon dioxide gas bubbles are produced biologically to facilitate flotation separation of suspended solids from a water stream held by a biological flotation clarifier.

Various dissolved air flotation clarifies and related apparatuses have been developed by Milos Krofta (U.S. Pat. Nos. 3307701; 4022696; 4184967; 4377485; 4626345; and 4931175), Joseph N. Parlette (U.S. Pat. No. 3820659), Jimmie A. Chittenden (U.S. Pat. No. 4216085), Leonard S. Love et al (U.S. Pat. No. 4303517), and Lawrence K. Wang et al (U.S. Pat. Nos. 5049320; 5068031; 5069783; and 5084165).

Several dispersed air flotation, diffused air flotation, froth flotation, gas stripping, and related apparatuses have been developed by Milos Krofta (U.S. Pat. No. 4157952, Donald E. Zipperian (U.S. Pat. No. 4735709), Jan D. Miller et al (U.S. Pat. No. 4838434), and Lawrence K. Wang et al (U.S. Pat. No. 5122165).

A few electroflotation clarifiers and related theory and principles have been developed by Milos Krofta (U.S. Pat. No. 4673494) and Lawrence K. Wang (U.S. Dept. of Commerce, National Technical Information Service, Springfield, Va., U.S.A., Report No. PB86-194198/AS, November 1985).

It has been a standard practice for environmental engineers to construct separate water treatment units to remove dissolved, colloidal, suspended, volatile, and living contaminants. The use of separate water treatment units for removal of various contaminants separately is technically feasible, but often economically unfeasible.

Still, such individual water treatment units are not flexible for operation. An ideal adsorptive bubble separation unit shall be able to be operated under several operational modes (such as dispersed air flotation, dissolved air flotation, electroflotation, and vacuum flotation), using various gases (such as air, oxygen, nitrogen, helium, carbon dioxide, ozone, chlorine, etc.).

Accordingly, it is an object of the present invention to provide an improved adsorptive bubble separation apparatus using various operational modes and various gas bubbles for flotation.

Another object of the present invention is to provide a combined coarse and fine gas bubbles separation process system and apparatus having a number of unique design features and using gas bubbles with various sizes for improving water treatment efficiently and cost savings. Said combined coarse and fine gas bubble separation process system includes the steps of influent water feeding, water flow measuring, coarse gas bubbling, chemical/microorganism feeding, fine gas bubbling, gas collection and purification, floated scum collection and discharge, settle sludge collection and discharge, and effluent water discharge.

A further object of the present invention is to provide a combined dispersed, dissolved, vacuum and electrolytic bubble separation apparatus for eliminating the need of many separate treatment units or devices, such as: (a) separate dispersed air flotation unit; (b) separate dissolved air flotation unit; (c) separate gas stripping unit; (d) separate vacuum flotation unit; (e) separate electroflotation unit; and (f) separate air emission control unit for adsorptive bubble separation of contaminants from water. While the aforementioned conventional treatment units or devices may be eliminated for cost savings, one or more of them may be adopted to the present invention as a standby when desired or when duplicate units are required by the monitoring agencies.

Still another object of the present invention is to provide a combined coarse and fine bubble separation apparatus having a coarse bubble chamber for generation of coarse gas bubbles with diameters much greater than 80 microns (generally greater than 250 microns) in turn, for complete mixing and gas stripping, and having a fine bubble chamber for generation of fine gas bubbles with diameters small than 80 microns, in turn, for flotation clarification of suspended matter in a water stream. The built-in air emission control means within the apparatus is for more efficient environmental protection and cost savings.

The major differences between the present invention and the state-of-the-art process methods are described below.

The state-of-the-art process methods described by Roger T. Becker (U.S. Pat. No. 4,872,997, issued on Oct. 10, 1989), Marian Szatkowski and Wilfred L. Freyberger (U.S. Pat. No. 4,737,272, issued on Apr. 12, 1988) and John H. Hoge and John H. Hubbard (U.S. Pat. No. 4,203,837, issued on May 20, 1980) all relate to the use of visible coarse air bubbles of various sizes for agitating a liquid stream, in turn for removing oil (U.S. Pat. No. 4,872,997), froth (U.S. Pat. No. 4,737,272) and foam (U.S. Pat. No. 4,203,837) from liquid streams. The method of the present invention, however, relates to the use of visible coarse gas bubbles (much greater than 80 microns in diameter; air or non-air gases) for agitating-/mixing/stripping a water stream under turbulent environment created by said coarse gas bubbles, and subsequently the use of extremely fine gas bubbles (much smaller than 80 microns in diameter; air or non-air) for quietly floating contaminants under a non-turbulent environment, creating (but not disturbing) a floating scum layer and a subnatant as a clarified effluent water.

Specifically in the system and method invented by Becker (U.S. Pat. No. 4,872,997), a batch of contaminated oil-coolant mixture is first filtered for removing solids, and then agitated by coarse air bubbles generated by a nozzle diffusion means for removing said oil from said mixture. The method of the present invention does not have a filtration step, does use coarse gas (air or non-air gas) generated by a jet gas diffusion means, a diaphragm diffusion means, an induced gas diffusion means, a porous tube diffusion means, a porous plate diffusion means, a nozzle diffusion means, a mechanical diffusion means, or combinations thereof, for agitation in a Coarse bubbling step, but also uses extremely fine gas bubbles (air or non-air; smaller than 80 microns in diameter) generated by a dissolved gas flotation means, an electroflotation means, a vacuum flotation means, or combination thereof, for quiet flotation without agitation in a Fine Bubbling step.

The froth flotation process method invented by Szatkowski et al (U.S. Pat. No. 4,737,272) is for separation of the floatable phase from the non-floatable phase of a slurry of particulate material in a froth flotation machine comprising a tank, an upper outlet port for discharge of the floatable phase, and a mechanism for delivering coarse air bubbles (in an arrange of 100-500 microns in bubble size in accordance with FIGS. 3-4 of Szatkowski's patent) to the slurry in the tank to form a froth for said froth flotation process. Both small size air bubbles and large size air bubbles to be used by Szatkowski's method are classified as visible coarse air bubbles (greater than 80 microns). The Fine Bubbling step of the present invention relates to a dissolved flotation process method, an electroflotation process method, a vacuum flotation process method, or combination thereof, which utilize(s) extremely fine gas bubbles smaller than 80 microns in diameter. Production of froth is not required for flotation in the present invention.

The process invented by Hoge et al (U.S. Pat. No. 4,203,837; FIG. 10; Column 4, lines 14-68) is again for removal of discrete particulates from liquids by foam flotation (or froth flotation) using coarse air bubbles and recycling a foam liquid, instead of by dissolved air flotation using fine air bubbles and not recycling a foam liquid as in the case of the present invention.

A Japanese patent, No. 61-227894, issued to T. Nishida on Oct. 9, 1986 discloses several batch type vessels for aeration, precipitation and discharging of a received contaminated water at specific timing and control so that at least one treating vessel is in a discharging step. Nishida's invention emphasized its advantage that a flow rate adjustment of either a basin or a sludge collecting device is unnecessary. Again only coarse air bubbles are used in Nishida's aeration vessels. The present invention, however, discloses a combined coarse and fine bubble separation system in which fine bubbles with diameters smaller than 80 microns can only be generated by one of modern dissolved gas flotation means invented by Lawrence K. Wang, Lubomyr Kurylko and Mu Hao S. Wang (U.S. Pat. Nos. 5,049,320 and 5,167,806), Milos Krofta (U.S. Pat Nos. 4,022,696, 4,377,485, 4,626,345, and 4,931,175), etc., one of modern electroflotation means invented by Lawrence K. Wang, Lubomyr Kurylko, and Mu Hao S. Wang (this invention), Laurence R. Goodman (U.S. Pat. No. 5,182,014), Eric Paul Austin (U.S. Pat. No. 4,101,409), Ronald C. Mehl (U.S. Pat. No. 3,523,891) etc., or one of vacuum flotation means invented by Lawrence K. Wang, Lubomyr Kurylko and Mu Hao S. wang (this invention), or other commercially available fine bubble generation means.

SUMMARY OF THE INVENTION

The present invention provides a combined coarse and fine bubble separation apparatus comprising in combination:

(a) an influent pipe means and a water flow measuring means connected to an influent pipe means for measuring an influent water stream flow;

(b) a coarse bubble chamber means directly or indirectly connected to said influent pipe means for holding and treating said influent water stream comprising feeders for feeding chemicals, enzymes, and/or microorganisms into said influent water stream, a coarse bubble distribution means positioned near bottom of said coarse bubble chamber means for generating coarse gas bubbles with diameters greater than 250 microns and for creating a complete mixing condition, a chamber inlet means near bottom of said coarse bubble chamber means for leading said influent water stream into said coarse bubble chamber means, and a chamber discharge means for discharging a pretreated effluent water stream from said coarse bubble chamber means;

(c) a fine bubble chamber means connected to said coarse bubble chamber means for receiving, holding, and treating said pretreated effluent water stream, comprising an inlet means for leading said pretreated effluent water stream into said fine bubble chamber means, a fine bubble distribution means positioned inside said fine bubble chamber means for generating fine gas bubbles with diameters small than 80 microns and for floating and separating suspended solids from said pretreated effluent water stream, a discharge means for discharging a clarified effluent water stream produced from said fine bubble chamber means, a scum collection means positioned above the water surface of said fine bubble chamber means for collecting and discharging floating scums and a sludge collection means positioned at bottom of said fine bubble chamber means for collecting and discharging settled sludges; said scum collection means further comprising a collector, a receiver, a scum discharge pipe, a scum pump, and a standby scum recycle pipe; said sludge collection means further comprising a collection trough, a sludge pump, and a sludge discharge pipe; and (d) a gas collection and purification means positioned on top of said coarse bubble chamber means and said fine bubble chamber means for collecting and purifying emitted gas streams from said coarse bubble chamber means and said fine bubble chamber means; said gas collection and purification means further comprising an enclosure for said coarse bubble chamber means, an enclosure for said fine bubble chamber means, a gas piping system connected to said enclosures, a foam collector-breaker means connected to said gas piping system for collecting and breaking foams from said emitted gas streams, a vacuum-pressure gauge connected to said foam collector-breaker means for measuring either vacuum or pressure of said gas stream; a gas flow meter connected to said vacuum-pressure gauge for measuring gas flow rate, a gas mover connected to said gas flow meter for moving said gas stream within said apparatus, a scrubber means connected to said gas mover for removing volatile inorganic compounds, a demister pad connected to said scrubber means for removing moisture from said gas steam, an adsorber connected to said demister pad for removing volatile organic compounds from said gas stream, a standby second gas mover connected to said adsorber for moving, recycling, or discharging said gas stream, and control valves for controlling gas flow.

The gas used in this invention is selected from a group comprising air, nitrogen, oxygen, helium, carbon dioxide, ozone, hydrogen, chlorine, or combinations thereof. Inert gases, such as nitrogen and helium, can be selectively injected to said gas collection and purification means to prevent possible ignition or explosion from happening at the adsorber bed.

The coarse bubble distribution means of this invention is a porous tube diffusion system, a porous plate, a diffusion system, a nozzle diffusion system, an induced gas diffusion system, a diaphragm diffusion system, a jet gas diffusion system, a mechanical diffusion system, or combinations thereof. At least one gas mover (gas blower), or gas compressor is to be installed in conjunction with said coarse bubble distribution means for generation of coarse gas bubbles.

The fine gas bubbles in this invention are produced in said fine bubble chamber means by said fine bubble distribution means which is supported by a dissolved gas flotation system, an electroflotation system, a vacuum flotation system, or combinations thereof.

Said dissolved gas flotation system of this invention further comprises:

(a) an enclosed cylindrical pressure vessel means having a tangentially disposed vessel inlet means connected to an inlet pipe means for delivering a water stream into said pressure vessel means, a pump means, a gas injector, a nozzle assembly means and said inlet pipe means cooperating to feed the water stream under conditions to yield a rotating water stream inside said pressure vessel means which rotates at of 2500 rpm; and said pressure vessel means further comprising a gas compressor. a pressure gauge, a safety valve, a gas bleed off valve means, a plural gas inlet means, a wall mounted porous plate assembly, and a center porous tube, for feeding and monitoring at least one gas into said pressure vessel means, gas flow meter means and regulator means connected to the plural gas inlet means for regulating pressure in said pressure vessel means to 2–7 atmospheres, and a vessel outlet means;

(b) a pressurized water release assembly means connected to the vessel outlet means of said pressure vessel means and positioned inside said fine bubble chamber means serving as a fine bubble distribution means; said pressurized water release assembly means further comprising a pressure reduction valve for allowing said water stream to be depressurized in stages under laminar flow conditions for generation of micro gas bubbles with diameter less than 80 microns in the depressurized water stream; and (c) a water piping system for feeding and recycling said water stream to said inlet pipe means.

Said electroflotation system of this invention further comprises:

(a) an electrical DC power source providing electrical energy to said electroflotation system, and comprising a positive DC power line and a negative DC power line;

(b) at least one anode electrode positioned inside a fine bubble chamber means and below water surface, and connected to said positive Dc power line for generating fine gas bubbles including oxygen bubbles and/or chlorine bubbles;

(c) at least one cathode electrode to pair each anode electrode; positioned inside said fine bubble chamber means below water surface, and connected to said negative DC power line for generating fine gas bubbles including at least hydrogen bubbles;

(d) an electrolyte monitoring and feeding system connected to said fine bubble chamber means for probing water conductivity and feeding electrolyte to said fine bubble chamber means upon demand; and (e) each pair of anode electrode and cathode electrode is a fine bubble distribution means for said electroflotation system.

Said vacuum flotation of this invention is facilitated when said enclosure is tightly installed and the pressure inside said fine bubble chamber means but above water surface is negative. Fine gas bubbles are produced in the bulk water held by said fine bubble chamber means due to a pressure difference between said bulk water and the gas above said water surface. For said vacuum flotation alone, there is no need to have a separate fine bubble distribution means because fine bubbles are generated throughout the entire bulk water.

The fine bubble distribution means of this invention, therefore, is mainly a pressurized water release assembly means for an adopted dissolved gas flotation system, or a pair of anode electrode and cathode electrode for an adopted electroflotation system, together with required facilities described previously.

Said gas collection and purification means of this invention can be removed, bypassed, or idled for cost savings when the emitted gas stream contains negligible amounts of gaseous contaminants.

When required, the coarse bubble chamber means of this invention is seeded with microorganisms and becomes a bioreactor for removal of mainly dissolved organics from a water stream. Said coarse bubble chamber means when used as a bioreactor requires recycling a portion of floating scum from said fine bubble chamber means to said coarse bubble chamber means in order to maintain a constant microorganisms population.

The shape of the apparatus of this invention is square, rectangular, circular, or oval.

The gas collection and purification means of this invention provides an alternative for recycling and reuse of a purified gas stream. More specifically, the purified gas stream can be recycled for reproduction of coarse bubbles inside said coarse bubble chamber means, or reproduction of fine bubbles (due to dissolved gas flotation) inside said fine bubble chamber means.

Still the gas collection and purification means of this invention that has an option to recycle and reuse the purified gas stream is equally effective when applied to a conventional gas stripping tower, a conventional dispersed air flotation, a conventional dissolved air flotation, or a conventional froth flotation.

Still the gas collection and purification means of this invention that may or may not recycle and reuse the purified gas stream is equally effective when applied to conventional gas stripping tower, conventional dispersed air flotation, conventional dissolved air flotation, conventional froth flotation, and conventional electroflotation.

A continuous bubble separation reactor system of this invention has at least one coarse bubble chamber for generating coarse bubbles, and at least one fine bubble chamber for generating fine bubbles; while a sequencing batch bubble separation reactor system of this invention has at least one combined chamber for generating coarse bubbles and then fine bubbles in a sequence.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A adopts a dissolved gas flotation system; while FIG. 1B adopts an electroflotation system;

FIG. 2A adopts a dissolved gas flotation system; while FIG. 2B adopts an electroflotation system;

FIG. 3A adopts a dissolved gas flotation system; while FIG. 3B adopts an electroflotation system;

FIG. 5B is the top view of a circular sequencing batch reactor; which FIG. 5C is the top view of a square sequencing batch reactor.

DESCRIPTION OF THE PREFERRED EMBODIMENTS

Figure 2A:
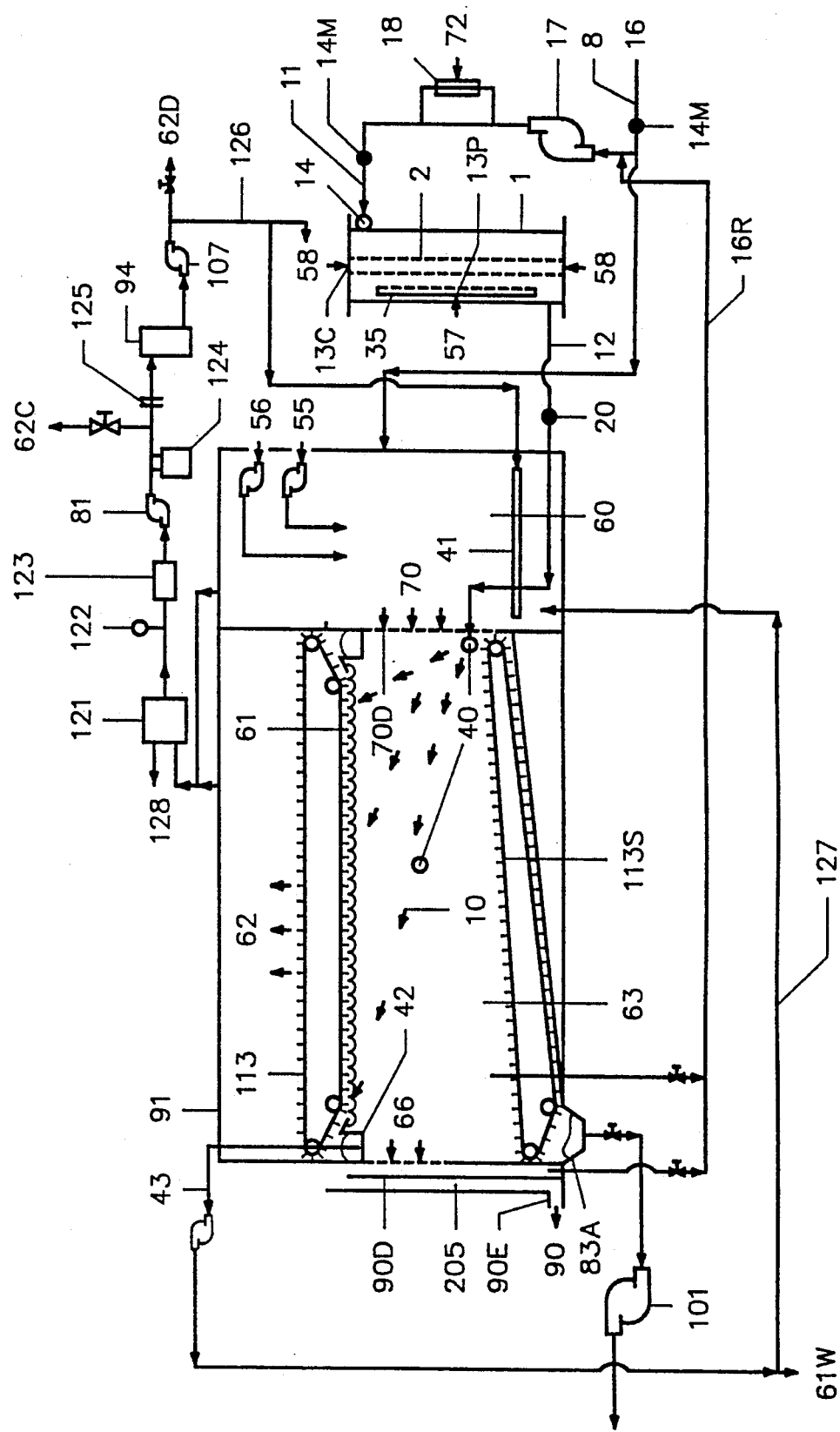
FIGS. 2A and 2B are the sectional views as well as the overall flow diagrams of two rectangular or square coarse and fine bubble separation process apparatus with stationary fine bubble distribution means, according to the present invention.
Figure 2B:
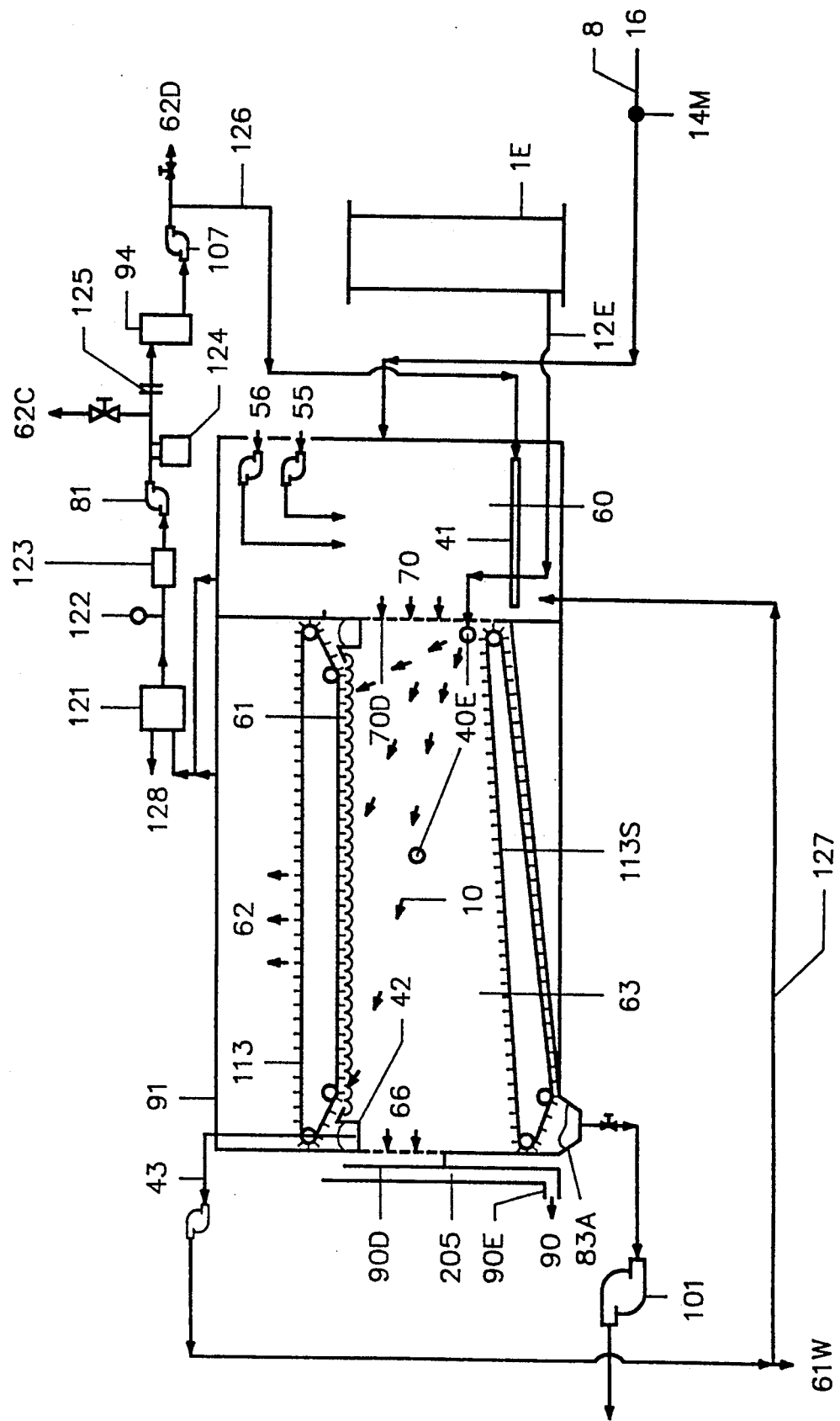
Figure 3A:
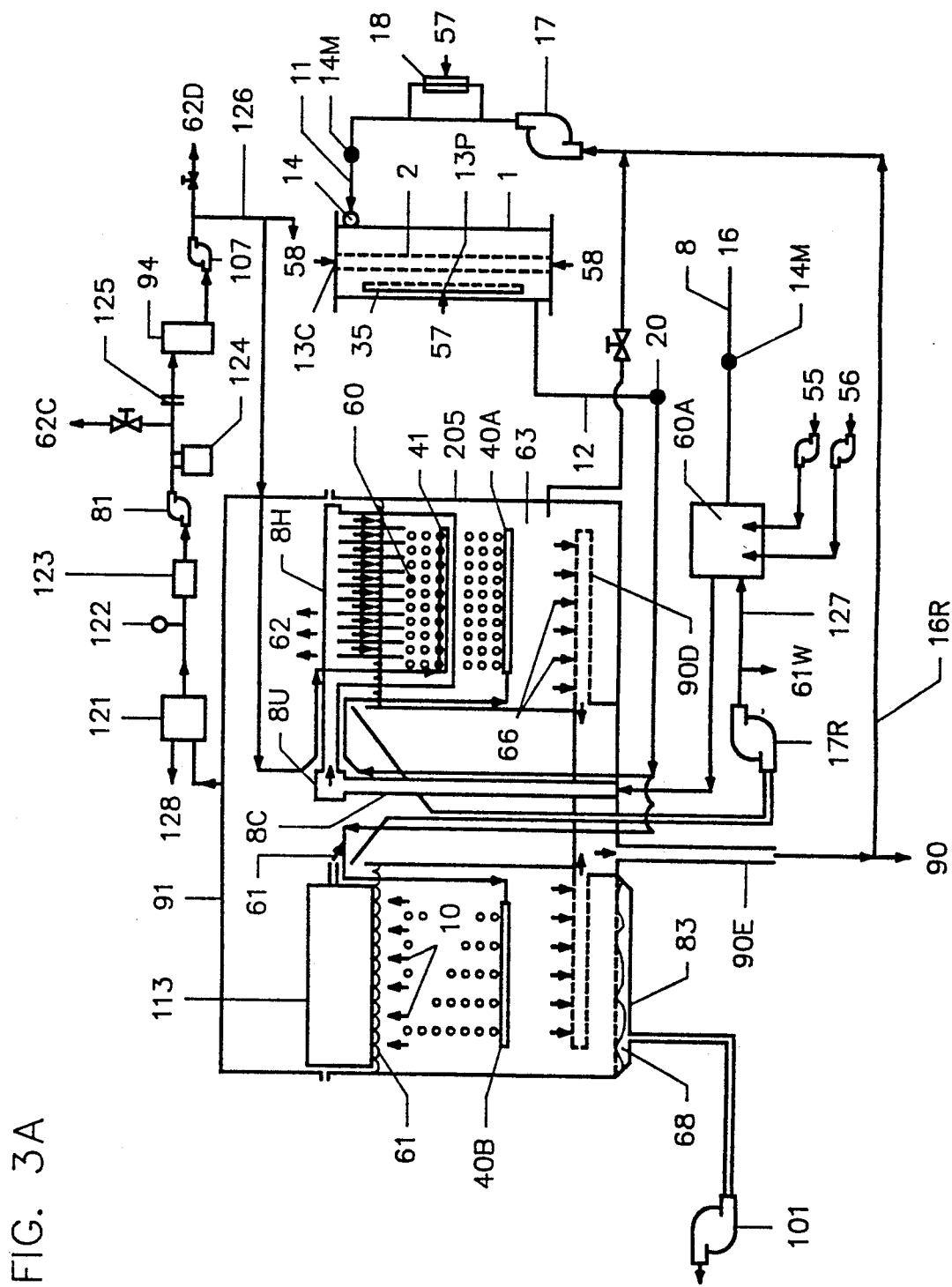
FIGS. 3A and 3B are the sectional views as well as the overall flow diagrams of two other circular coarse and fine bubble separation process apparatus with rotating and traveling fine bubble distribution means, according to the present invention.
Figure 3B:
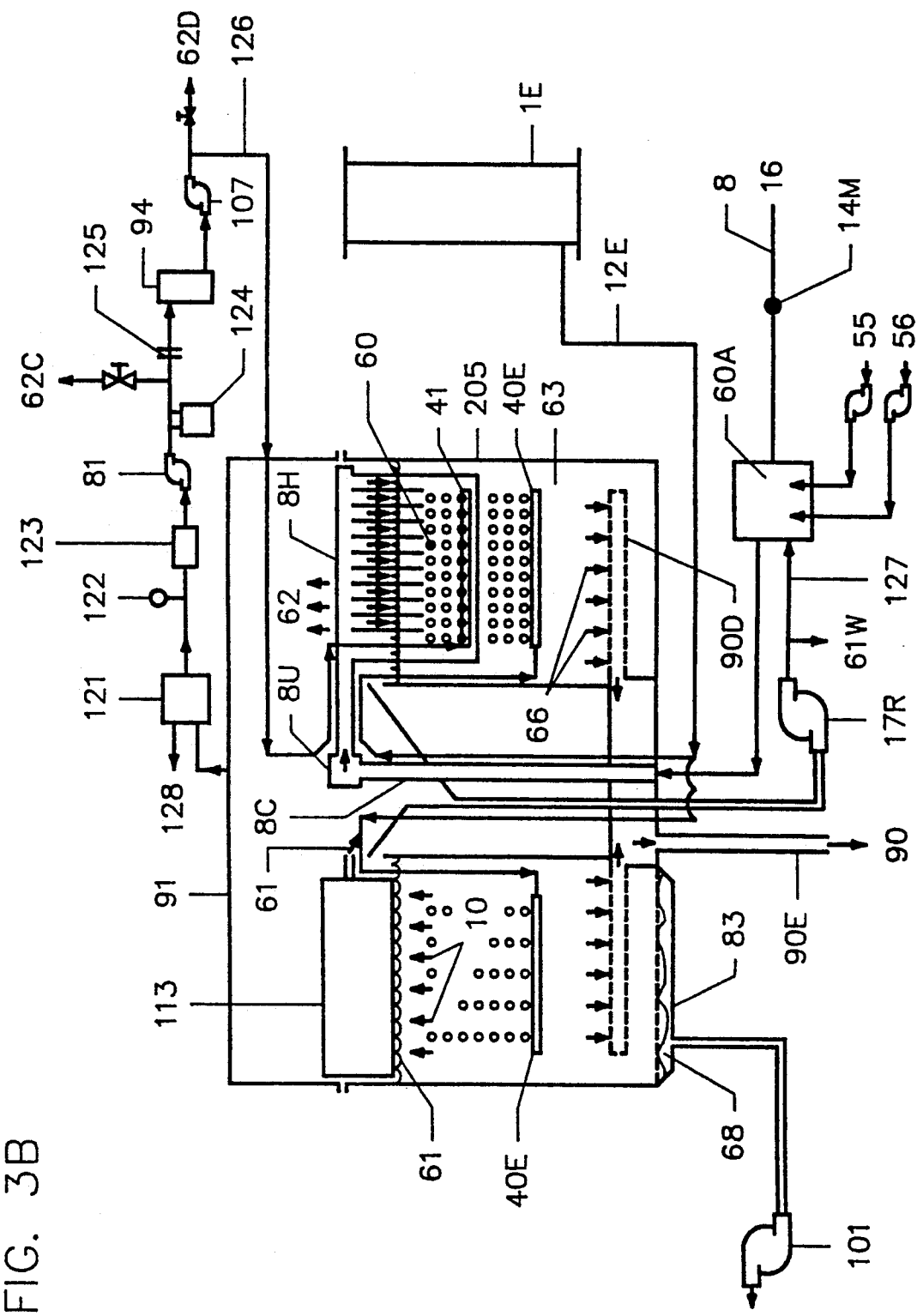
Figure 4:
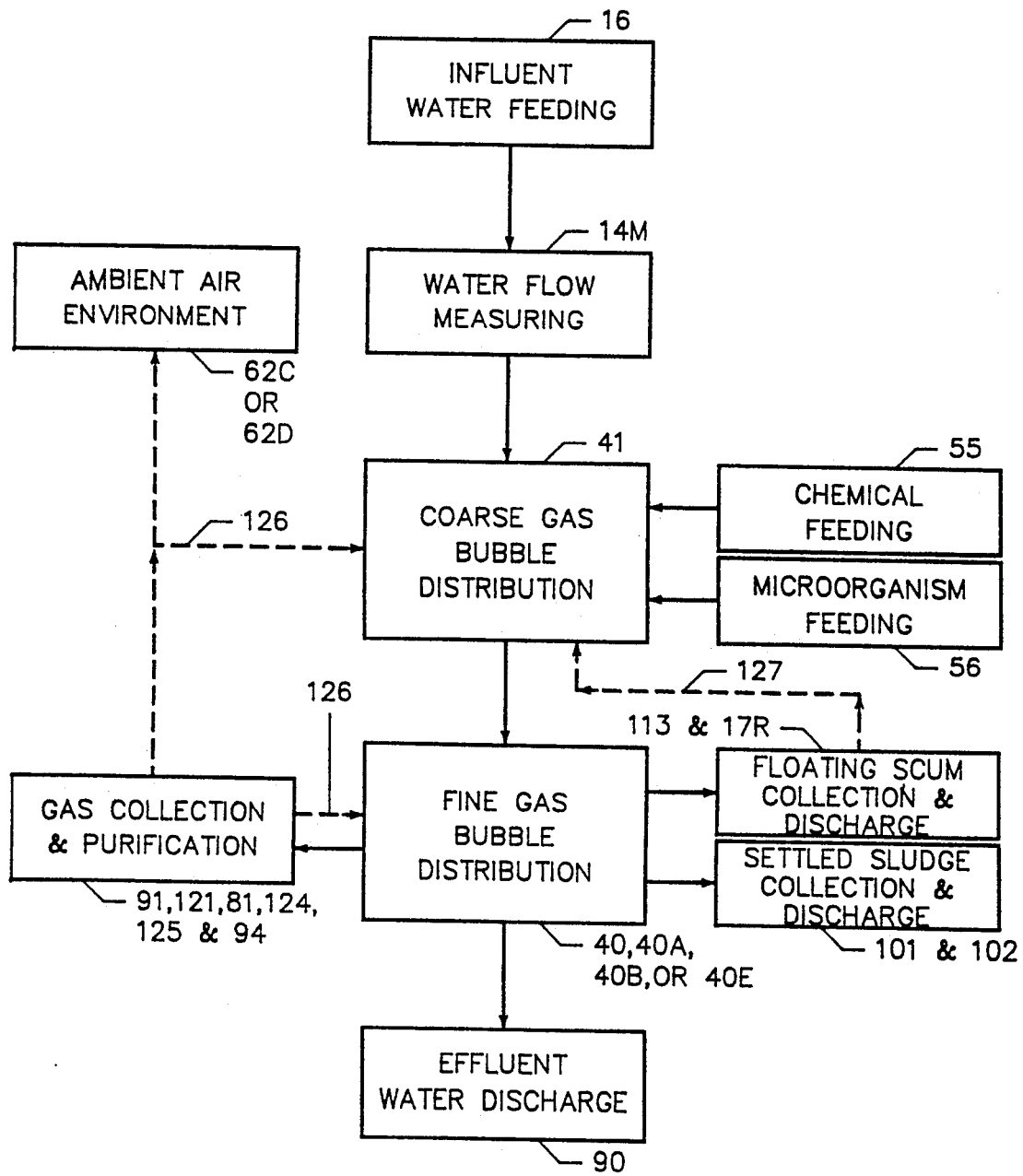
FIG. 4 shows the block flow diagrams of the combined and coarse and fine bubble separation process in accordance with this invention.

Referring now in detail to the drawings for the purpose of illustrating preferred embodiments of the present invention, a continuous combined coarse and fine bubble separation process and its apparatus thereof are shown in FIGS. 1A, 1B, 2A, 2B, 3A, and 3B, which all include common process steps of: influent water feeding 16, influent water flow measuring 14M, chemical/microorganism feeding 55 and 56, coarse gas bubbling 41 (mixing, gas stripping, bio-oxidation), fine gas bubbling 40 (clarification), gas collection and purification 91 ( including foam collection and breaking 121, gas moving 81, scrubbing 124, dehumidifying 125, gas adsorbing 94, and gas recycling 126), settled sludge collection 101 and discharge 102, floated scum collection 113, and discharge 17R, and effluent water discharge 90, as shown in FIG. 4.

Figure 1A:
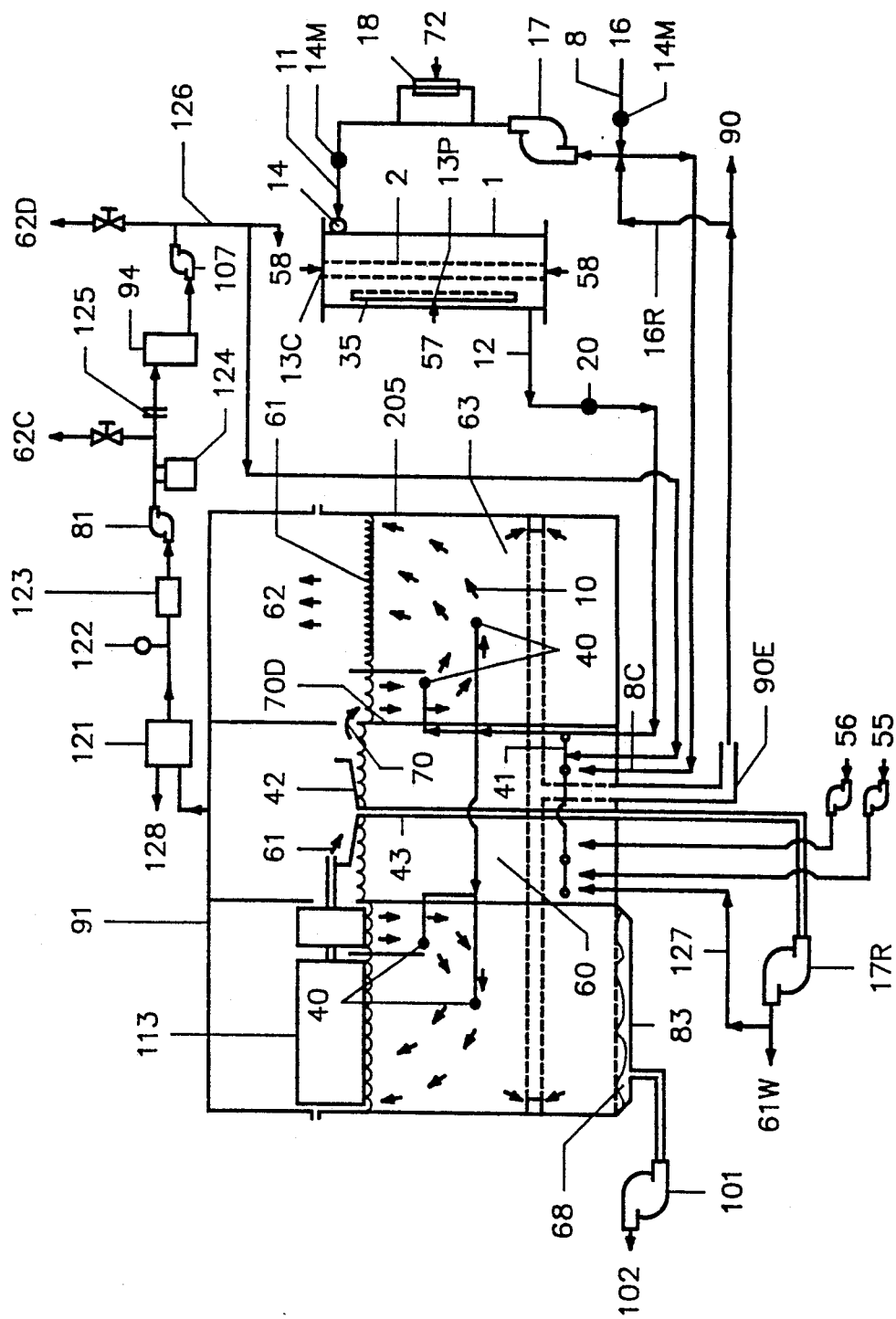
FIGS. 1A and 1B show the sectional views as well as the overall flow diagrams of two circular coarse and fine bubble separation process apparatus with stationary fine bubble distribution means, according to the present invention.

FIGS. 1A, 2A, and 3A illustrate three combined coarse and fine bubble separation process apparatuses that adopt dissolved gas flotation technology for generation of fine gas bubbles with diameters smaller than 80 microns. Of the three process apparatus drawings, FIG. 1A shows a circular apparatus tank 205 with stationary fine bubble distribution means 40; FIG. 2A shows a rectangular or square apparatus 205; while FIG. 3A shows a circular apparatus 205 with rotating and traveling fine bubble distribution means 40.

In operating one of the three combined coarse and fine bubble separation process apparatuses shown in FIGS. 1A, 2A, and 3A, the influent water 16 is fed to a coarse bubble chamber means 60 of one said apparatus through an influent pipe means 8, a water flow measuring means 14M and a chamber inlet means 8C. To the water stream inside said coarse bubble chamber means 60, chemical and/or microorganisms are fed by respective feeders 55 and 56 for pretreatment. A coarse bubble distribution means 41 is positioned near bottom of said coarse bubble chamber means 60 for generating coarse gas bubbles with diameters greater than 250 microns and for creating total mixing under turbulent hydraulic condition inside said coarse bubble chamber means 60, where the water stream is chemically treated in the presence of chemicals or biologically treated in the presence of microorganisms, and physically treated by gas stripping effect in the presence of coarse gas bubbles, thereby producing a pretreated effluent water stream 70, and an emitted gas stream 62. Said coarse bubble distribution means 41 is connected to at least one gas blower (or gas compressor) 107 for producing coarse gas bubbles, and is made of porous tube diffusion system, porous plate diffusion system, nozzle diffusion system, induced gas diffusion system, diaphragm diffusion system, mechanical diffusion system, jet gas diffusion system, or combinations thereof.

Said jet gas diffusion system is commercially available from Mass Transfer Systems, Inc., Fall River, Mass., U.S.A. Said diaphragm diffusion system is available from EIMCO Process Equipment Company, Salt Lake City, Utah, U.S.A. Said induced gas diffusion system is available from Aeromix Systems, Inc. Minneapolis, Minn., U.S.A. Said porous tube diffusion system, porous plate diffusion system, said nozzle diffusion system and said mechanical diffusion system are described in a book entitled "Water and Wastewater Engineering, Volume 2" and published by John Wiley & Sons, Inc. New York, N.Y., U.S.A., and another book authored by Lawrence K. Wang et al, entitled "Handbook of Environmental Engineers, volume 3, Biological and Natural Control Processes", and published by Humana Press, Clifton, N.J., U.S.A.

The pretreated effluent water stream 70 from said coarse bubble chamber means 60 shown in FIGS. 1A, 2A, and 3A overflows to a fine bubble chamber means 63 through a chamber discharge means 70D (Note: the chamber discharge means 70D of said coarse bubble chamber means 60 is also the inlet means of said fine bubble chamber means 63). A fine bubble distribution means 40 is positioned inside said fine bubble chamber means 63 for generating fine gas bubbles 10, in turn, for floating suspended solids and surface active substances from bulk water to water surface under laminar hydraulic condition without any mixing or turbulent inside said fine bubble chamber means 63, thereby forming a floating scum 61, a clarified effluent water stream 90, and additional emitted gas stream 62. Small amount of non-floatable, and settleable contaminants, however, become a settled sludge 68.

Said fine bubble distribution means 40 shown in FIGS. 1A, 2A, and 3A also known as the pressurized water release assembly means is connected to a pressure reduction valve 20 and an enclosed cylindrical pressure vessel means 1, a nozzle assembly means 14, a second water flow measuring means 14M, a gas injector 18, and a pressure pump 17, as shown in FIGS. 1A, 2A, and 3A.

Said influent water 16 or a recycled water 16R, or both, is/are pumped by said pressure pump 17 to said enclosed cylindrical pressure vessel means 1, and simultaneously various gases 57, 58, and 72 are fed to said enclosed cylindrical pressure vessel means 1 through a wall-mounted porous plate assembly means 35, a center porous tube 2, and said gas injector 18, respectively. The enclosed cylindrical pressure vessel means 1 has a tangentially disposed water stream vessel inlet means 11 for delivering said water stream 16 or 16R into said pressure vessel means 1 to yield a rotating water stream inside said pressure vessel means 1 which rotates at over 2500 rpm surrounding said center porous tube 2 and under 2-7 atmospheres of pressure to facilitate rapid dissolution of said gases 57, 58, 72, or combinations thereof into said water stream 16 or 16R. The pressurized water from the vessel outlet means 12 which contains supersaturated dissolved gases is then released by the fine bubble distribution means 40 (i.e. pressurized water release assembly means) for generation of extremely fine bubbles 10 with diameters smaller than 80 microns, in turn, for flotation of suspended solids and surface active substances from water, forming a floating scum 61 on water surface. A scum collection means comprising a collector 113, a receiver 42, and a discharge pipe 43 is positioned just above the water surface of said fine bubble chamber means 63, and collects said floating scum 61 by said collector 113, and discharges said floating scum 61 to said receiver 42 and said discharge pipe 43. A scum pump 17R recycles a portion of said floating scum 127 to said coarse bubble chamber means 60 when necessary, and wastes the remaining unwanted scum 61W. A small amount of settleable matter in the bulk water held by said fine bubble chamber means 63 is settled in a sludge collection trough 83, and be collected by a sludge pump 101, and wasted through a sludge discharge pipe 102. The clarified effluent water stream 90 is collected and discharged by collection pipes 90D and 90E, and partially recycled as the recycled water stream 16R.

Said center porous tube 2 can be as long as said pressure vessel means 1 or shorter than said pressure vessel means 1. Besides, either said wall mounted porous plate assembly means 35 or said center porous tube 2 can be disconnected, or idled.

An emitted gas stream 62 from both said coarse bubble chamber means 60 and said fine bubble chamber means 63 is collected and purified by a gas collection and purification means (FIGS. 1A, 2A, and 3A), comprising an enclosure 91, a foam collector-breaker means 121, a vacuum-pressure gauge 122, a gas flow meter 123, a first gas mover 81, a scrubber means 124, a demister pad 125, an adsorber 94, a second gas mover (gas blower) 107, and a gas piping system including a gas recycle pipe means 126. The purified gas is recycled to either said pressure vessel means 1 or said coarse bubble distribution means 41 through said gas recycle pipe means 126. Alternatively, said emitted gas stream 62 may be discharged to ambient air environment 62C and 62D, with partial gas purification and total gas purification, respectively.

The same gas collection and purification means comprising said enclosure 91, foam collector-breaker means 121, vacuum-pressure gauge 122, gas flow meter 123, first gas mover 81, scrubber means 124, demister pad 125, an adsorber 94, second gas mover 107, gas piping system 126, or combinations thereof, is also adopted by the electroflotation systems of this invention shown in FIGS. 1B, 2B, 3B, 5A, 5B and 5C and is removable.

Said foam collector-breaker means 121 is installed on the apparatus of this invention for collecting, breaking, and removing foam from said emitted gas stream 62. The emitted gas stream 12 which is purified by said foam collector-breaker means 121 flows to said scrubber means 124, said demister pad 125 and said adsorber 94 for further removal of inorganic pollutants, moisture, and organic pollutants, respectively. The condensed foam 128 is wasted; while the purified gas stream is either discharged to ambient air environment 62D, or recycled through a gas pipe means 126 for further generation of gas bubbles in said coarse bubble chamber means 60 and/or said fine bubble chamber means 63.

Figure 1B:
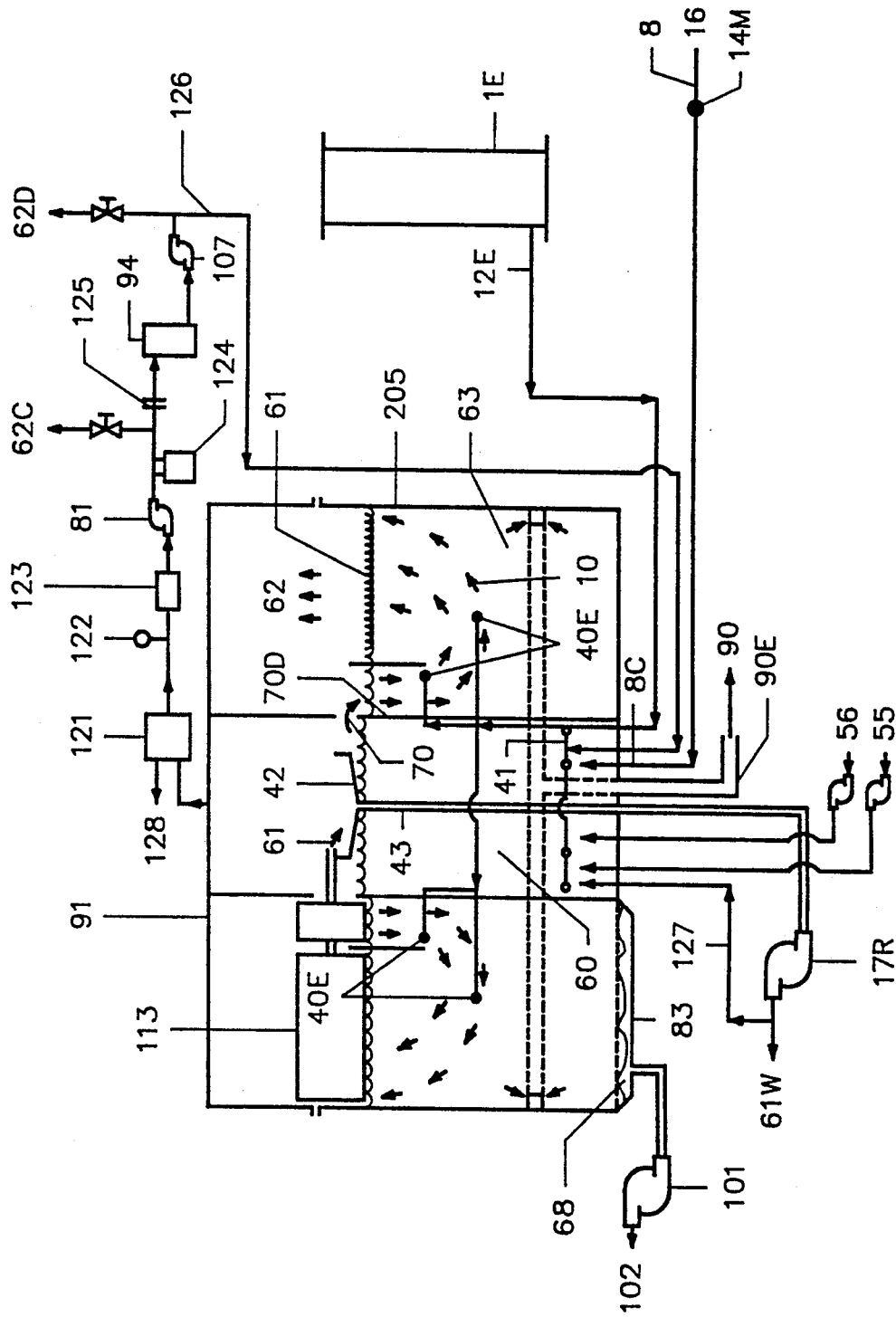
Figure 5A:
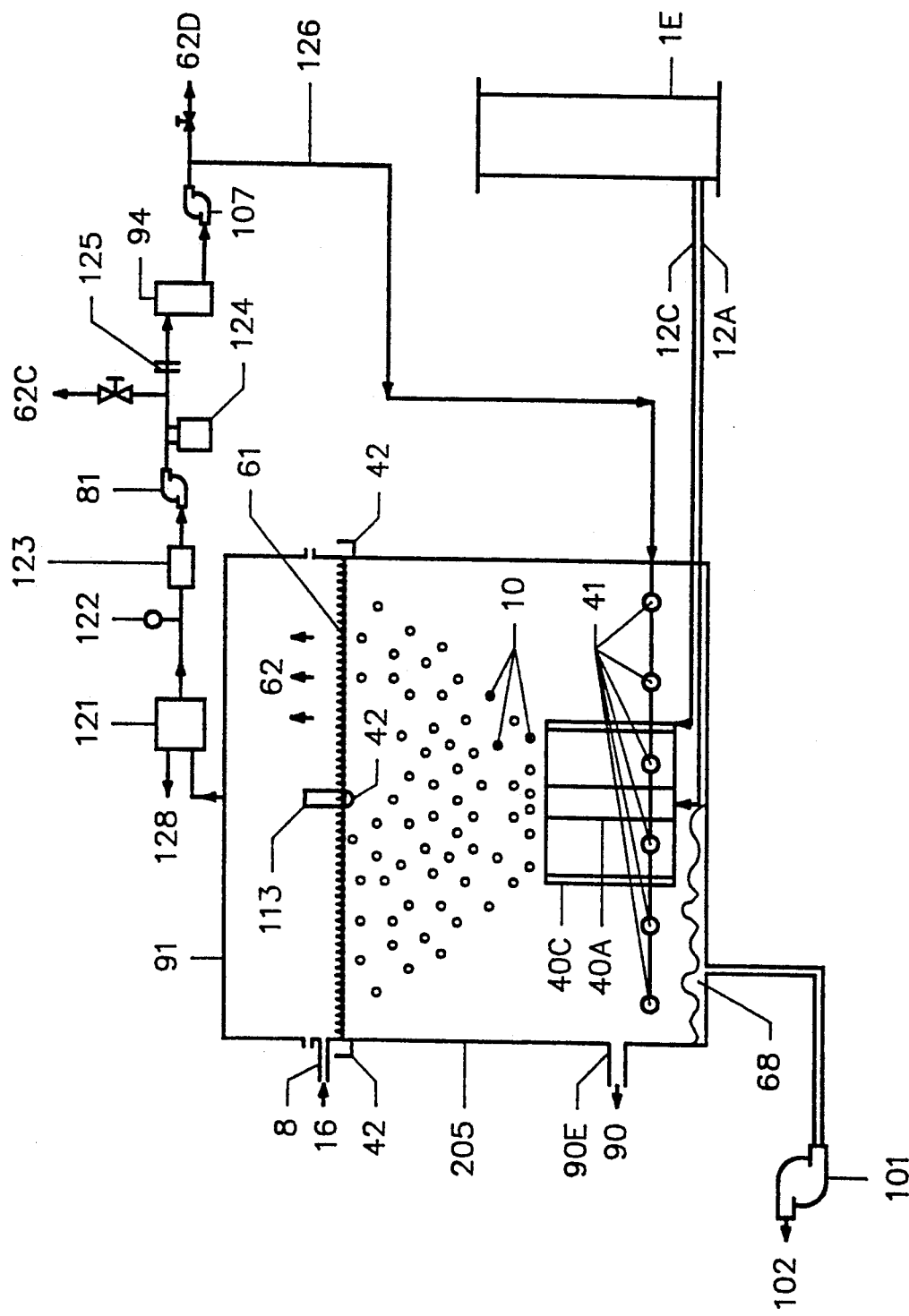
FIGS. 5A, 5B, and 5C illustrate two sequencing batch reactors involving the use of both dispersed gas flotation and electroflotation.
Figure 5B:
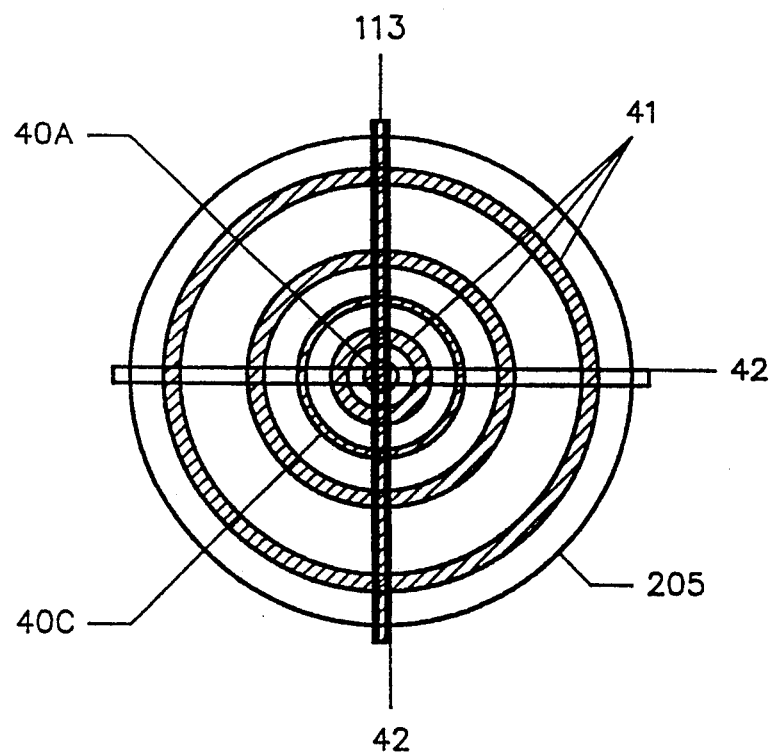
Figure 5C:
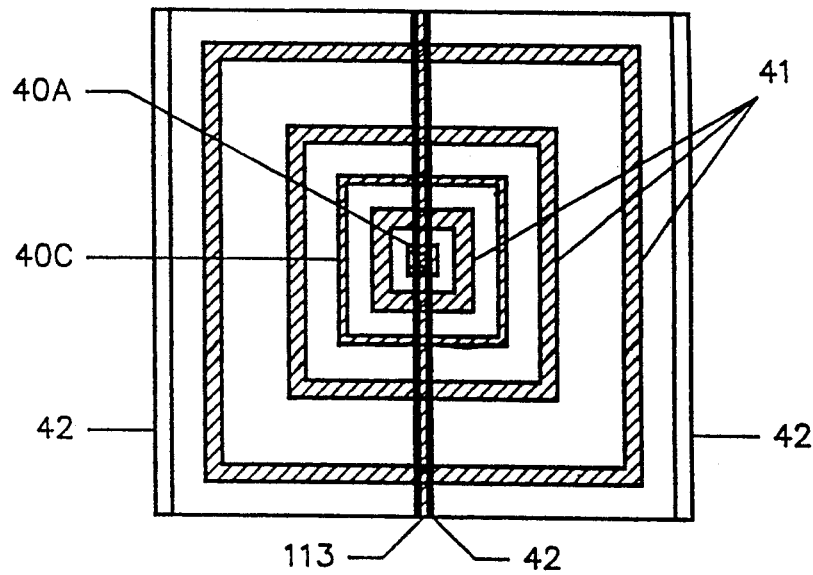

FIGS. 1B, 2B, and 3B illustrate three continuous combined coarse and fine bubble separation apparatuses in which electroflotation technology is applied instead of dissolved air flotation technology for generation of fine gas bubbles. FIGS. 5A, 5B, and 5C illustrate two batch combined coarse and fine bubble separation apparatuses both involving the use of electroflotation technology.

As shown in FIGS. 1B, 2B, and 3B a continuous electroflotation system of this invention comprises:

(a) an electrical DC power source 1E providing electrical energy (direct current) to said electroflotation system, (b) a DC power line 12E comprising a combination of a positive DC power line and a negative DC power line, and transmitting said electrical energy to at least one anode/cathode electrode pair 40E, also known as said fine bubble distribution means, (c) said anode/cathode electrode pair 40E positioned inside said fine bubble chamber means 63 but below water surface, and connected to said electrical Dc power source 1E through said Dc power line 12E for generating fine gas bubbles 10, and (d) an electrolyte monitoring and feeding system 210 connected to said fine bubble chamber means 63 for probing water conductivity and feeding electrolyte to said fine bubble chamber means 63, upon demand.

In summary, said continuous combined coarse and fine bubble separation apparatus using electroflotation technology (FIGS. 1B, 2B, and 3B) generates fine gas bubbles according to eletrochemical reactions, and relying on the aforementioned electrical DC power source 1E, DC power line 12E (a combination of a positive DC power line and a negative DC power line), anode/cathode electrode pair 40E (which is a fine bubble distribution means), and electrolyte monitoring and feeding system 210. Said continuous combined coarse and fine bubble separation apparatus using dissolved gas flotation technology (FIGS. 1A, 2A, and 3A), however, generates fine gas bubbles according to physical gas dissolving and releasing operations, and relying on the previously discussed pressure pump 17, gas injector 18, nozzle assembly means 14, pressure vessel means 1, pressure reduction valve 20, and fine bubble distribution means 40.

All the remaining portions (i.e. Said influent water feeding 16, water flow measuring 14M, coarse gas bubble distribution 41, chemical feeding 55, microorganism feeding 56, floating scum collection 113, floating scum discharge 17R, settled sludge collection 101, settled sludge discharge 102, effluent water discharge 90, and gas collection and purification 91, 121, 81, 124, 125, and 94, etc. shown in FIG. 4) of said continuous combined coarse and fine bubble separation apparatus using electroflotation technology (FIGS. 1B, 2B, and 3B) are identical to that of said continuous combined coarse and fine bubble separation apparatus using dissolved gas flotation technology (FIGS. 1A, 2A, and 3A).

The continuous apparatus tank 205 shown in FIGS. 1A and 1B are circular in shape. Besides, their coarse bubble distribution means 41, fine bubble distribution means 40 or 40E (pressurized water release assembly), coarse bubble chamber means 60, fine bubble chamber means 63, collection pipe 90D, enclosure 91 and receiver 42 are all circular. Both said fine bubble distribution means 40 or 40E and said coarse bubble distribution means 41 shown in FIGS. 1A and 1B are multiple stationary circular rings. The collector 113 is a rotating scoop which travels 360 degrees over the top of said fine bubble chamber means 63 for collecting floating scum 61.

The continuous apparatus tank 205 shown in FIGS. 3A and 3B are also circular in shape. However, the coarse bubble distribution means 41, the fine bubble distribution means 40 or 40E are straight elements instead of circular rings. Besides, the coarse bubble chamber means 60, coarse bubble distribution means 41, the fine bubble distribution means 40 or 40E, and the collector 113 113 all rotate 360 degrees surrounding an universal joint 8U and a center inlet pipe means 8C.

The continuous apparatus tank 205 including both the coarse bubble chamber means 60 and the fine bubble chamber means 63 shown in FIGS. 2A and 2B are rectangular or square in shape. Accordingly, the enclosure 91 is also rectangular or square. The preferred coarse bubble distribution means 41 is stationary, and can be singular or multiple circular rings or straight bars. The preferred fine bubble distribution means 40 or 40E shown in FIGS. 2A and 2B is also stationary. Although the preferred collector 113 shown in FIGS. 2A and 2B is rotating chain-type with paddles, the rotating/traveling scoop-type of collector 113 shown in FIGS. 1A and 1B, or both, can also be adopted for rectangular or square apparatus of this invention. The collection pipe 90D shown in FIGS. 2A and 2B is either stationary type or traveling type.

A batch combined coarse and fine bubble separation apparatus known as a sequencing batch reactor based on electroflotation technology is illustrated in FIGS. 5A, 5B and 5C. Both the batch systems (FIGS. 5A, 5B and 5C) and the continuous systems (FIGS. 1B, 2B and 3B) share same basic flow diagram as shown in FIG. 4, except that a batch system (FIGS. 5A, 5B or 5C) generates coarse gas bubbles and fine gas bubbles in sequence and in same chamber means 205; while a continuous system (FIGS. 1B, 2B, or 3B) continuously and simultaneously generates coarse gas bubbles and fine gas bubbles 10 in said coarse bubble chamber means 60 and said fine bubble chamber means 63, respectively.

The electrochemical reactions of both said batch system (FIGS. 5A, 5B and 5C) and said continuous system (FIGS. 1B, 2B and 3B) for generation and distribution of fine gas bubbles are identical and are illustrated in the following paragraphs. For normal electroflotation operation without adding electrolytes, the gas bubbles produced from an electroflotation apparatus of this invention consist of mainly fine hydrogen bubbles and oxygen bubbles resulting from electrolysis of water. The electrochemical reactions occurring at the electrodes (40E for a continuous system shown in FIGS. 1B, 2B or 3B; 40C and 40A for a batch system shown in FIGS. 5A, 5B and 5C) to produce gases are shown below:

Anode 40A Reaction

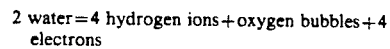
2 water = 4 hydrogen ions + oxygen bubbles + 4 electrons

Cathode 40C Reaction

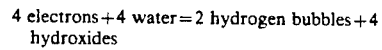
4 electrons + 4 water = 2 hydrogen bubbles + 4 hydroxides

Total Reaction

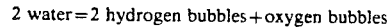
2 water = 2 hydrogen bubbles + oxygen bubbles

From these reactions, it can be seen that for each 4 electrons of electrical current passed between the electrodes, one molecule of oxygen bubbles are formed. Or in more convenient terms, 0.174 milliliter of gas, measured at standard temperature and standard pressure are produced, by each coulomb of electrical current. Electrolysis of water produces fine gas bubbles with diameters of the order of 80 microns that are formed at the electrodes (40E, 40C and 40A) and rise in the apparatus tank 205 as fine mist for floating suspended solids.

With addition of electrolytes, such as sodium chloride, with said electrolyte monitoring and feeding system 210, fine chlorine gas bubbles can also be formed for the purpose of disinfection. The preferred electrolyte of this invention includes sodium chloride, potassium chloride, calcium chloride, sodium bromide, potassium bromide, sodium iodide, potassium iodide, calcium bromide, calcium iodide, or combinations thereof.

Each DC power source 1E (shown in FIGS. 1B, 2B, 3B and 6A) is either equipped with a transformer and connected to an AC power source, or not equipped with a transformer, but connected to both a transformer and an AC power source.

When operating a batch combined coarse and fine bubble separation apparatus shown in FIGS. 5A, 5B, 5C and 4, an influent water 16 is fed to said apparatus tank 205 through a flow measuring means 14M and an inlet pipe means 8. Chemical feeder means 55 and microorganism feeder means 56 can be provided upon demand. After said influent water 16 is filled into said apparatus tank 205 reaching the level of receivers 42, influent water feeding stops, and coarse gas bubbles generation and distribution begins. A gas mover (gas blower or equivalent) 107 provides gas to a coarse bubble distribution means and generates coarse gas bubbles through said coarse bubble distribution means inside said apparatus tank 205. In the presence of coarse gas bubbles, the influent water 16 inside said apparatus tank 205 is totally mixed with chemical and/or microorganisms under turbulent hydraulic condition, and any volatile organic compounds (VOCs), surface active agents (SAAs) originally in said influent water 16 are removed from water phase and concentrated in gas phase, thereby producing an emitted gas stream 62 and a pretreated effluent containing chemical flocs and/or biological flocs. The emitted gas stream 62 containing VOCs, SAAs and others is transported by gas movers 81 and 107, monitored by a vacuum-pressure gauge 122 and a gas flow meter 123, and purified by a foam collector-breaker means 121, a scrubber means 124, a demister pad 125, and an adsorber 125, thereby producing a purified gas. The purified gas is either discharged to ambient air environment 62D or recycled through a gas pipe 126 to said coarse bubble distribution means 41 for further producing coarse gas bubbles. Referring to FIGS. 4 and 5A now, after coarse gas bubbling is over, said gas mover 107 stops, and a DC power source 1E is turned on, and connected to a cathode 40C and an anode 40A with a negative DC power line 12C and a positive DC power line 12A, respectively. Due to electrochemical reactions described earlier, fine hydrogen bubbles, oxygen bubbles and chlorine bubbles are formed from cathode 40C and anode 40A inside said apparatus tank 205 for flotation of suspended solids including said chemical flocs and biological flocs under laminar hydraulic condition, thereby forming floating scums 61 on water surface. Either during or after fine gas bubbling with electroflotation, a collector 113 positioned over water surface removes said floating scums 61 from water surface, an emitted gas stream 62 over water surface, and a clarified effluent 90 below floating scums. Either during or after fine gas bubbling with electroflotation, a collector 113 positioned over water surface removes said floating scums 61 from water surface, to receivers 42. The step of fine gas bubbling with electroflotation produces said clarified effluent 90 which is discharged through a collection pipe 90E after said DC power source 1E is turned off. Any settled sludge 68 or residual floating scums 61 can be pumped out of said apparatus tank 205 from bottom by a sludge pump 101 and wasted through a sludge discharge pipe 102.

FIGS. 5B and 5c are the top views of a circular sequencing batch apparatus and a square or rectangular) sequencing batch apparatus, respectively. The side view of both circular sequencing batch apparatus (FIGS. 5B) and square sequencing batch apparatus (FIG. 5C) is shown in FIG. 5A. In batch processing, said collector 113 of circular batch apparatus (FIG. 5B) rotates clockwise or counterclockwise, or both, and collects said floating scums 61 in said receivers 42. Said collector 113 of square batch apparatus (FIG. 5C), however, travels horizontally to left, then to right, back-and-forth for collecting said floating scums 61 in multiple parallel receivers 42.

The shape of batch apparatus as well as continuous apparatus of this invention can be square, rectangular, circular, or oval.

Both continuous apparatus (FIGS. 1A, 1B, 2A, 2B, 3A and 3B) and batch apparatus (FIGS. 5A, 5B and 5C) of this invention can take advantage of vacuum flotation technology when said enclosure 91 is tightly covered, and the pressure inside said apparatus tank 205 is controlled at negative side. Additional fine gas bubbles are produce due to vacuum flotation technology in addition to that produced due to either dissolved gas flotation technology (FIGS. 1A, 2A and 3A), or electroflotation technology (FIGS. 5A, 5B and 5C).

Said gas collection and purification means of this invention which comprises said enclosure 91, said foam collector-breaker means 121, said vacuum-pressure gauge 122, said gas flow meter 123, said gas mover 81, said scrubber means 124, said demister 125, said adsorber 94 and said gas piping system 108 can be selectively idled or disconnected for service or cost-saving.

Said scrubber means 124 of this invention is a wet scrubber using liquid absorbent, a dry scrubber using dry absorbent, or a combination thereof, and can be selectively idled or disconnected if the concentration of volatile inorganic compounds in said emitted gas stream 62 is very low and negligible.

Said foam collector-breaker means 121 of this invention can be selectively idled or disconnected if no stable foam is present in said emitted gas stream 62.

Said demister pad 125 and said adsorber 94 of this invention can be selectively idled or disconnected if the concentration of volatile organic compounds in said emitted gas stream 62 is low and negligible.

The batch bubble separation apparatus shown in FIGS. 5A, 5B and 5C involves the use of electroflotation technology for generation of fine gas bubbles. The facilities relating to electroflotation technology shown in FIG. 5A include said Ac power source, said Dc power source 1E, said DC power lines 12C and 12A, and said anode/cathode electrode pair 40C and 40A.

Similarly the facilities of dissolved air flotation technology applied to continuous bubble separation apparatuses shown in FIGS. 1A, 1B and 1C including mainly said pressure pump 17, gas injector 72, flow measuring means 14M, vessel inlet means 11, nozzle assemble means 14, center porous tube 2, wall-mounted porous plate assemble 13P, vessel outlet means 12, pressure reduction valve 20, and pressurized water release assembly 40, can also replace said facilities of electroflotation technology (AC power source, DC power source 1E, DC power lines 12A and 12C, and anode/cathode electrode pair 40A and 40C), and be applied to the batch bubble separation apparatus.

Specifically the batch bubble separation apparatus of this invention either adopts said electroflotation technology (shown in FIGS. 5A, 5B and 5C), or adopts said dissolved gas flotation technology (not shown; but described in last paragraph).

Said continuous bubble separation apparatus using dissolved gas flotation technology (FIGS. 1A, 2A, 3A), continuous bubble separation apparatus using electroflotation technology FIGS. 1B, 2B, and 3B), batch bubble separation apparatus using electroflotation technology (FIGS. 5A, 5B and 5C), batch bubble separation apparatus using dissolved gas flotation technology (not shown), or combinations thereof, can be skid mounted, truck mounted, rail car mounted, or boat mounted for enhancing mobility. The bottom of each apparatus can be either flat or sloped.

When said electroflotation technology involving the use of AC power source, DC power source 1E, Dc power line 12A and 12C, and anode/cathode electrode pair 40A and 40C is applied to the apparatus of this invention (FIGS. 1B, 2B, 3B and 5A) for generating fine gas bubbles, either permanent electrodes or sacrificing electrodes (such as aluminum electrode or iron electrode) or both, can be adopted. sacrificing electrodes may produce metal hydroxides for flocculation. Specifically aluminum electrode produces aluminum hydroxide flocs, while iron electrode produces iron hydroxide flocs. Both aluminum hydroxide flocs and iron hydroxide flocs enhance chemical treatment of said influent water 16.

A special feature of this invention relates to said gas collection and purification means (91, 121, 81, 124, 125, and 94 shown in FIG. 4) which removes surface active, volatile inorganic and volatile organic substances from said emitted gas stream 62, thereby produces a purified gas stream which is suitable for recycling through a gas recycle pipe 126 to said bubble separation system, or discharging to an ambient environment 62C or 62D.

Liquid adsorbents and dry adsorbents are used in said wet scrubber means 124 and dry scrubber means 124, respectively, for removing volatile inorganic substances from said emitted gas stream 62.

Addition of said demister pad 125 of this invention significantly increases the efficiency of said adsorber 94 for removing toxic volatile organic as well as inorganic substances in said emitted gas stream 62. Said adsorber 94 is packed with granular or fibrous/tenuous adsorbents such as activated carbons or catalysts. The former (activated carbons) adsorb volatile toxic substances which are mainly organics in accordance with physical surface adsorption phenomena preferably in the absence of elevated heat; while the latter (catalysts) converts toxic volatile organic and inorganic substances such as benzene, carbon tetrachloride, hydrogen cyanide, formaldehyde, etc., into non toxic gases, such as carbon dioxide, nitrogen and water in accordance with the following chemical catalytic conversion reactions in the presence of oxygen and heat:

benzene + oxygen = carbon dioxide + water carbon tetrachloride + oxygen + water = carbon dioxide + water + hydrogen chloride hydrogen cyanide + oxygen = carbon dioxide + water + nitrogen formaldehyde + oxygen = carbon dioxide + water In case carbon tetrachloride concentration in said emitted gas stream 62 is high and catalysts are used in said adsorber 94 for gas purification, the hydrogen chloride (HCl; forming hydrochloric acid with water) produced in the above catalytic conversion reaction must be neutralized by alkaline substances. Installation of a scrubber means 124 at downstream of said adsorber 94 solves this acidic problem.

The batch bubble separation apparatus or this invention utilizing electroflotation technology, dissolved gas flotation technology, vacuum flotation technology, or combinations thereof, is classified as an advanced sequencing batch reactor (SBR) which is a self-contained treatment system incorporating equalization, feeding, coarse bubble treatment, fine bubble treatment, floating scum removal, settled sludge removal, effluent discharge, air emission control and optional gas recycle all within the confines of a single batch reactor. Best performance of the batch apparatus of this invention is attained when two or more of the batch bubble separation apparatus are operated in an ordered sequence. However, single batch apparatus operation provides totally acceptable results.

Technically the batch bubble separation process and apparatus of this invention is classified as an advanced sequencing batch reactor (SBR) which involves separate batch process steps in a sequence for operation: (1-a) filling an influent water 16; (1-b) reacting said influent water stream 16 with chemicals, and other substances, such as enzymes, microorganisms, etc. upon demand; (2) generating coarse gas bubbles for mixing, stripping volatile contaminants, supplying dissolved gas (including oxygen); and thereby producing an emitted gas stream 62 and a Pretreated effluent water stream 70; and further collecting and treating said emitted gas stream 62 for discharging to an ambient environment or recycling to said apparatus for reuse; (3) generating fine gas bubbles for floating and separating lightweight insoluble flocs (including chemical flocs biological flocs or both) from said pretreated effluent water stream 70 inside said apparatus; thereby producing a clarified effluent water 90, additional emitted gas stream 62, small amount of floating scums 61 and settled sludges 68; and further collecting and treating said emitted gas stream 62 for discharging to an ambient environment or recycling to said apparatus for reuse; (4) decanting said clarified effluent water 90; (5) wasting said floating scums 61 and settled sludges 68; and (6) idling or preparing said bubble separation apparatus ready for another cycle of water treatment. The operating time of each step is adjustable from zero minute. Said batch bubble separation apparatus of this invention includes: the batch bubble separation apparatus using electroflotation technology shown in FIGS. 5A, 5B, and 5C, and the batch bubble separation apparatus using dissolved gas flotation technology (not shown but previously described), both for simplified but improved treatment of water, groundwater, wastewater, or process water.

Specifically an improved method for operating the batch bubble separation apparatus of this invention to treat a contaminated influent water stream 16, either automatically or manually, using an electroflotation technology, a dissolved gas flotation technology, a vacuum technology, or combinations thereof, comprises the following steps in sequence with adjustable operating time for each step:

(1) selecting a Fill step (first step) which is composed of either Static Fill (first step A), or React Fill (first step B);

(1-a) introducing said influent water stream 16 to an apparatus tank 205 of said apparatus under a non-mixed, non-gas bubbled environment until the apparatus tank 205 is filled, if Static Fill (first step A) is chosen;

(1-b) introducing said influent water stream 16 to said apparatus tank 205 and feeding chemicals, enzymes, microorganisms, or combinations thereof, to said influent water stream 16 under turbulent environment created by coarse gas bubbling, or mechanical mixing, or both, until the apparatus tank 205 is filled;

(2) stopping Fill step (first step) and starting Coarse Bubbling Step (second step) to treat the influent water stream 16 with chemicals, enzymes, microorganisms, or combinations, thereof, using coarse gas bubbles with diameters much greater than 80 microns ( about 250 microns) generated by the technologies of jet gas diffusion, diaphragm diffusion, induced gas diffusion, porous tube diffusion, porous plate diffusion, nozzle diffusion, mechanical diffusion, or combinations thereof, for mixing, stripping volatile contaminants, supplying gas, and thereby producing an emitted gas stream 62, and a pretreated effluent water stream 70; optionally collecting, monitoring and purifying said emitted gas stream 62, thereby producing a purified gas stream, and further discharging said purified gas stream to an ambient air environment or to said apparatus for reuse;

(3) stopping Coarse Bubbling Step (second step) and starting Fine Bubbling Step (third step) using fine gas bubbles with diameters less than 80 microns generated by the technologies of electroflotation, dissolved gas flotation, or combinations thereof, for floating suspended, oily, and surface active contaminants from said pretreated effluent water stream 70 inside said apparatus tank 205, thereby producing a clarified effluent water 90, additional emitted gas stream 62, small amount of floating scums 61 and settled sludges 68; optionally collecting, monitoring and purifying said emitted gas stream 62, thereby producing a purified gas stream, and further discharging said purified gas stream to an ambient air environment or to said apparatus for reuse;

(4) stopping Fine Bubbling Step (third step) and starting Decant Step (fourth step) for discharging said clarified effluent water 90 (subnatant) near but above the bottom of said apparatus tank 205, without disturbing the floating scums 61 on the top, and the settled sludge 68 at the bottom;

(5) stopping Decant Step (fourth step) and starting Sludge Removal Step (fifth step) for removal of the floating scums 61 on water surface of said apparatus tank 205 as well as the settled sludges 68 at the bottom of said apparatus tank 205;

(6) stopping Sludge Removal Step (fifth step) and entering Idle Step (sixth step) when there is more than one apparatus tank 205, or no more treatment is needed, to allow the apparatus tank 205 to remain idle until the apparatus tank 205 is ready for another cycle time; and (7) repeating another cycle for treating more influent water stream 16.

Said batch bubble separation apparatus of this invention involves the use of either single sequencing batch reactor (single apparatus tank 205), or multiple sequencing batch reactors (multiple apparatus tanks 205) at least in pairs. When multiple sequencing batch reactors in pairs are adopted, one half of apparatus tanks 205 is for water processing (reaction, flocculation and clarification), and the remaining one half is for scum-water separation and sludge-water separation. The two sequencing batch reactors (two apparatus tanks 205) in each pair are used for water processing and separation of scums and sludges alternately.

For a multiple sequencing batch reactors system in which more than two sequencing batch reactors ( more than two apparatus tanks 205) are adopted, the number of sequencing batch reactors for water processing or for separation of scums and sludges depends upon the required operating time of each step described above and below.

The Fill Step is defined as the first step of said batch bubble separation process for filling the batch bubble separation apparatus with the influent water stream 16.

The Static Fill is one of the first steps during which said influent water stream 16 is introduced to said batch bubble separation apparatus under a non-mixed, non-gas bubbled environment inside said batch bubble separation apparatus.

The React Fill is another one of the first steps during which said influent water stream 16 and chemicals, enzymes, microorganisms, or combinations thereof, are fed to said batch bubble separation apparatus simultaneously under turbulent environment created by coarse gas bubbling or mechanical mixing.

The Coarse Bubbling Step is the second step of said batch bubble separation process for generating coarse gas bubbles, mixing said influent water stream 16, supplying dissolved gas to said influent water stream 16, producing a pretreated effluent water stream 70 and an emitted gas stream 62, and finally collecting, monitoring, purifying and discharging said emitted gas stream 62 generated from the batch bubble separation apparatus.

The Fine Bubbling Step is the third step of said batch bubble separation process for generating fine gas bubbles, floating suspended, oily and surface-active contaminants from said pretreated effluent water stream 70 inside said batch bubble separation apparatus, producing a clarified effluent water 90, additional emitted gas stream 62, small amount of floating scums 61 and settled sludges 68, and finally collecting, monitoring, purifying and discharging the emitted gas stream 62 generated from the batch bubble separation apparatus.

The Decant Step is the fourth step of said batch bubble separation process for discharging said clarified effluent water 90 near but above the bottom of said batch bubble separation apparatus, without disturbing the floating scums 61 on the top and the settled sludges 68 at the bottom.

The Sludge Removal Step is the fifth step of said batch bubble separation process for removing the floating scums 61 and the settled sludges 68 from said batch bubble separation apparatus.

The Idle Step is the sixth step of said batch bubble separation process for allowing the batch bubble separation apparatus to remain idle until the batch bubble separation apparatus is ready to begin another cycle of water treatment.

Said chemicals adopted by this invention include ferric chloride, ferric sulfate, aluminum chloride, aluminum sulfate, ferrous chloride, ferrous sulfate, poly aluminum chloride, poly aluminum sulfate, poly iron sulfate, poly iron chloride, sulfuric acid, hydrochloric acid, sodium hypo chlorite, calcium hypo chlorite, chlorine, hydrogen peroxide, powdered activated carbon, cationic polyelectrolyte, anionic polyelectrolyte, nonionic polymer, calcium hydroxide, potassium hydroxide, sodium hydroxide, sodium bicarbonate, magnesium hydroxide, calcium oxide, sodium carbonate, sodium aluminate, potassium aluminate, sodium phosphate, potassium phosphate, sodium nitrate, potassium nitrate, nitric acid, magnesium carbonate, magnesium chloride, potassium bicarbonate, potassium carbonate, calcium chloride, calcium iodide, potassium iodide, sodium iodide, sodium bromide, potassium bromide, or combinations thereof. Said microorganisms adopted by this invention include aerobic microorganisms. anaerobic microorganisms, facultative microorganisms, enzymatic microorganisms, or combinations thereof.

Said continuous bubble separation apparatus, said batch bubble separation apparatus, or both, of this invention can selectively be connected in parallel or in series for physical gas stripping treatment, chemical treatment, electrochemical treatment, aerobic biological treatment, anaerobic biological treatment, facultative biological treatment, anoxic biological treatment, or combinations thereof.

What is claimed is:

1. A method for operating an enclosed batch bubble separation apparatus to treat a contaminated influent water stream containing volatile organic compounds and suspended, oily and surface active contaminants, either automatically or manually, using an electroflotation means, a dissolved gas flotation means, a vacuum flotation means, or combinations thereof, comprising the following steps in sequence:

(1) introducing said influent water stream to an apparatus tank of said apparatus as a fill step until the apparatus is filled with said influent water stream, thereby producing a filled influent water;

(2) stopping said fill step, and starting a Coarse Bubbling Step to treat the filled influent water with added chemicals, enzymes, microorganisms, or combinations thereof, with gas bubbles consisting essentially of coarse gas bubbles with diameters greater than 80 microns generated by a jet gas diffusion means, a diaphragm diffusion means, an induced gas diffusion means, a porous tube diffusion means, a porous plate diffusion means, a nozzle diffusion means, a mechanical diffusion means, or combinations thereof, for mixing, stripping said volatile organic contaminants, supplying dissolved gas, and thereby producing an emitted gas stream, and a pretreated effluent water; collecting, monitoring and purifying said emitted gas stream, thereby producing a purified gas stream, and further discharging said purified gas stream to an ambient air environment or recycling said purified gas stream to said apparatus for reuse;

(3) stopping said Coarse Bubbling Step and starting a Fine Bubbling Step with gas bubbles consisting essentially of fine gas bubbles with diameters less than 80 microns generated by an electroflotation means, a dissolved gas flotation means, a vacuum flotation means, or combinations thereof, for floating said suspended, oily, and surface active contaminants from said pretreated effluent water inside said apparatus tank, thereby producing a clarified effluent water, additional emitted gas stream, small amount of floating scums and settled sludges; collecting, monitoring and purifying said emitted gas stream, thereby producing a purified gas stream, and further discharging said purified gas stream to an ambient air environment or recycling said purified gas to said apparatus for reuse;

(4) stopping said Fine Bubbling Step and starting a Decant Step for discharging said clarified effluent water near but above the bottom of said apparatus tank, without disturbing the floating scums on the top of said clarified effluent water, and the settled sludge at the bottom of said apparatus tank;

(5) stopping said Decant Step and starting a Sludge Removal Step for removal of the floating scums and the settled sludges from said apparatus tank, upon demand;

(6) stopping said Sludge Removal Step and entering an optional idle step allowing the apparatus tank to remain idle until the apparatus tank is ready for another cycle time; and (7) repeating another cycle for treating more said influent water stream.

2. The method of claim 1 wherein said fine gas bubbles with diameters less than 80 microns are generated by a dissolved gas flotation means requiring the following means in combination:

(a) an enclosed cylindrical pressure vessel means having a tangentially disposed water stream vessel inlet means connected to an inlet pipe means for delivering a water stream into said pressure vessel means, a pump means, a gas injector, a nozzle assembly means and said inlet pipe means cooperating to feed the water stream under conditions to yield a rotating water stream inside said pressure vessel means which rotates at over 2500 rpm; and said pressure vessel means further comprising a gas compressor, a pressure gauge, a safety valve, gas bleed off valve means, plural gas inlet means, a wall-mounted porous plate assemble, and a porous center tube, for feeding and monitoring at least one gas into said pressure vessel means, gas flow meter means and regulator means connected to the plural gas inlet means for regulating pressure in said pressure vessel means to two to seven atmospheres, and a vessel outlet means; said gas being air, oxygen, nitrogen, helium, carbon dioxide, ozone, chlorine, or combinations thereof, (b) a pressurized water release assembly means connected to the vessel outlet means of said pressure vessel means and positioned inside said fine bubble chamber means said pressurized water release assembly means further comprising a pressure reduction valve for allowing said water stream to be depressurized in stages under laminar flow conditions for generating micro gas bubbles with diameter less than 80 microns in a depressurized water stream, and (c) a water piping system for feeding an untreated water stream or recycling a clarified effluent water into said inlet pipe means.

3. A method for operating a batch bubble separation apparatus to treat a contaminated influent water stream containing volatile organic compounds and suspended, oily and surface active contaminants, either automatically or manually, using an electroflotation means, or a dissolved gas flotation means, or both, comprising the following steps in sequence:

(1) introducing said influent water stream to an apparatus tank of said apparatus as a fill step until the apparatus is filled with said influent water stream, thereby producing a filled influent water;

(2) stopping said fill step, and starting a Coarse Bubbling Step to treat the filled influent water with added chemicals, enzymes, microorganisms, or combinations thereof, with gas bubbles consisting essentially of coarse gas bubbles with diameters greater than 80 microns generated by a jet gas diffusion means, a diaphragm diffusion means, an induced gas diffusion means, a porous tube diffusion means, a porous plate diffusion means, a nozzle diffusion means, a mechanical diffusion means, or combinations thereof, for mixing, stripping volatile organic contaminants, supplying dissolved gas, and thereby producing an emitted gas stream, and a pretreated effluent water;

(3) stopping said Coarse Bubbling Step and starting a Fine Bubbling Step with gas bubbles consisting essentially of fine gas bubbles with diameters less than 80 microns generated by an electroflotation means, a dissolved gas flotation means, or both, for floating said suspended, oily, and surface active contaminants from said pretreated effluent water inside said apparatus tank, thereby producing a clarified effluent water, additional emitted gas stream, small amount of floating scums and settled sludges;

(4) stopping said Fine Bubbling Step and starting a Decant Step for discharging said clarified effluent water near but above the bottom of said apparatus tank, without disturbing the floating scums on the top of said clarified effluent water, and the settled sludge at the bottom of said apparatus tank;

(5) stopping said Decant Step and starting a Sludge Removal Step for removal of the floating scums and the settled sludges from said apparatus tank, upon demand;

(6) stopping said Sludge Removal Step and entering an optional idle step allowing the apparatus tank to remain idle until the apparatus tank is ready for another cycle time; and (7) repeating another cycle for treating more said influent water stream.

4. The method of claim 3 wherein said fine gas bubbles with diameters less than 80 microns are generated by a dissolved gas flotation means requiring the following means in combination:

(a) an enclosed cylindrical pressure vessel means having a tangentially disposed water stream vessel inlet means connected to an inlet pipe means for delivering a water stream into said pressure vessel means, a pump means, a gas injector, a nozzle assembly means and said inlet pipe means cooperating to feed the water stream under conditions to yield a rotating water stream inside said pressure vessel means which rotates at over 2500 rpm; and said pressure vessel means further comprising a gas compressor, a pressure gauge, a safety valve, gas bleed off valve means, plural gas inlet means, a wall-mounted porous plate assemble, and a porous center tube, for feeding and monitoring at least one gas into said pressure vessel means, gas flow meter means and regulator means connected to the plural gas inlet means for regulating pressure in said pressure vessel means to two to seven atmospheres, and a vessel outlet means; said gas being air, oxygen, nitrogen, helium, carbon dioxide, ozone, chlorine, or combinations thereof, (b) a pressurized water release assembly means connected to the vessel outlet means of said pressure vessel means and positioned inside said fine bubble chamber means said pressurized water release assembly means further comprising a pressure reduction valve for allowing said water stream to be depressurized in stages under laminar flow conditions for generating micro gas bubbles with diameter less than 80 microns in a depressurized water stream, and (c) a water piping system for feeding an untreated water stream or recycling a clarified effluent water into said inlet pipe means.

5. A method for operating an enclosed batch bubble separation apparatus to treat a contaminated influent water stream containing volatile organic compounds and suspended, oily and surface active contaminants, either automatically or manually, using an electro-flotation means, a dissolved gas flotation means, a vacuum flotation means, or combinations thereof, comprising the following steps in sequence:

(1) introducing said influent water streams to an apparatus tank and feeding chemicals, enzymes, microorganisms, or combinations thereof, to said influent water stream with coarse gas bubbling or mechanical mixing, or both, until the apparatus tank is filled with said influent water stream, thereby producing a filled influent water as a fill step, said mechanical mixing is created using a mechanical mixer means; said coarse gas bubbling is created by using coarse gas bubbles having diameters greater than 80 microns and produces an emitted gas stream; during coarse gas bubbling, collecting, monitoring and purifying said emitted gas stream, thereby producing a purified gas stream, and further discharging said purified gas stream to an ambient air environment or to said apparatus for reuse;

(2) stopping said fill step, and starting a coarse bubbling step to treat the filled influent water with said chemicals, said enzymes, said microorganisms, or combinations thereof, and with gas bubbles consisting essentially of coarse gas bubbles with diameters greater than 80 microns generated by a jet gas diffusion means, a diaphragm diffusion means, an induced gas diffused means, a porous tube diffusion means, a porous plate diffusion means, a nozzle diffusion means, a mechanical diffusion means, or combinations thereof, for mixing, stripping said volatile organic contaminants, supplying dissolved gas, and thereby producing an emitted gas stream, and a pretreated effluent water; collecting, monitoring and purifying said emitted gas stream, thereby producing a purified gas stream, and further discharging said purified gas stream to an ambient air environment or recycling said purified gas stream to said apparatus for reuse;

(3) stopping said coarse bubbling step and starting a fine bubbling step using gas bubbles consisting essentially of fine gas bubbles with diameters less than 80 microns generated by an electro-flotation means, a dissolved gas flotation means, a vacuum flotation means, or combinations thereof, for floating said suspended, oily, and surface active contaminants from said pretreated effluent water inside said apparatus tank, thereby producing a clarified effluent water, additional emitted gas stream, small amount of floating scum and settles sludge; collecting, monitoring and purifying said emitted gas stream, thereby producing a purified gas stream, and further discharging said purified gas stream to an ambient air environment or recycling said purified gas to said apparatus for reuse;

(4) stopping said fine bubbling step and starting a decant step for discharging said clarified effluent water near but above the bottom of said apparatus tank, without disturbing the floating scum on the top of said clarified effluent water, and the settled sludge at the bottom of said apparatus tank, (5) stopping said decant step and starting a sludge removal step for removal of the floating scum and the settled sludge from said apparatus tank, upon demand;

(6) stopping said sludge removal step and entering an optional idle step for allowing the apparatus tank to remain idle until the apparatus tank is ready for another cycle time.

(7) repeating another cycle for treating more of said influent water stream.

6. The method of claim 5 wherein said fine gas bubbles with diameters less than 80 microns are generated by a dissolved gas flotation means requiring the following means in combination:

(1) an enclosed cylindrical pressure vessel means having a tangentially disposed water stream vessel inlet means connected to an inlet pipe means for delivering a water stream into said pressure vessel means, a pump means, a gas injector, a nozzle assembly means and said inlet pipe means cooperating to feed the water stream under conditions to yield a rotating water stream inside said pressure vessel means which rotates at over 2500 rpm; and said pressure vessel means further comprising a gas compressor, a pressure gauge, a safety valve, gas bleed off valve means, plural gas inlet means, a wall mounted porous plate assembly, and a porous center tube, for feeding and monitoring at least one gas into said pressure vessel means, gas flow meter means and regulator means connected to the plural gas inlet means for regulating pressure in said pressure vessel means to two to seven atmospheres, and a vessel outlet means; said gas being air, oxygen, nitrogen, helium, carbon dioxide, ozone, chlorine, or combinations thereof, (2) a pressurized water release assembly means connected to the vessel outlet means of said pressure vessel means and positioned inside a fine bubble chamber means, said pressurized water release assembly means further comprising a pressure reduction valve for allowing said water stream to be depressurized in stages under laminar flow conditions for generating micro-gas bubbles with diameter less than 80 microns in a depressurized water stream;

(3) a water piping system for feeding an untreated water stream or recycling a clarified effluent water into said inlet pipe means.

7. A method for operating a batch bubble separation apparatus to treat a contaminated influent water stream containing volatile organic contaminants and suspended, oily and surface active contaminants, either automatically or manually, using an electro-flotation means, or a dissolved gas flotation means, or both, comprising the following steps in sequence:

(1) introducing said influent water stream to said apparatus tank and feeding chemicals, enzymes, microorganisms, or combinations thereof, to said influent water stream with said coarse gas bubbling or said mechanical mixing, or both, until the apparatus tank is filled with said influent water stream, thereby producing a filled influent water as a fill step, said mechanical mixing is created using a mechanical mixer means; said coarse gas bubbling is created by using coarse gas bubbles having diameters greater than 80 microns and produces an emitted gas stream; during coarse gas bubbling, collecting, monitoring and purifying said emitted gas stream, thereby producing a purified gas stream, and further discharging said purified gas stream to an ambient air environment or to said apparatus for reuse;

(2) stopping said fill step, and starting a coarse bubbling step to treat the filled influent water with said chemicals, said enzymes, said microorganisms, or combinations thereof, and with gas bubbles consisting essentially of coarse gas bubbles with diameters greater than 80 microns generated by a jet gas diffusion means, a diaphragm diffusion means, an induced gas diffusion means, a porous tube diffusion means, a porous plate diffusion means, a nozzle diffusion means, a mechanical diffusion means, or combinations thereof, for mixing, stripping said volatile organic contaminants, supplying dissolved gas, and thereby producing an emitted gas stream, and a pretreated effluent water;

(3) stopping said coarse bubbling step and starting a fine bubbling step using gas bubbles consisting essentially of fine gas bubbles with diameters less than 80 microns generated by an electro-flotation means, a dissolved gas flotation means, or both, for floating said suspended, oily, and surface active contaminants from said pretreated effluent water inside said apparatus tank, thereby producing a clarified effluent water, additional emitted gas stream, small amount of floating scum and settled sludge;

(4) stopping said fine bubbling step and starting a decant step for discharging said clarified effluent water near but above the bottom of said apparatus tank, without disturbing the floating scum on the top of said clarified effluent water, and the settled sludge at the bottom of said apparatus tank;

(5) stopping said decant step and starting a sludge removal step for removal of the floating scum and the settled sludge from said apparatus tank, upon demand;

(6) stopping said sludge removal step and entering an optional idle step for allowing apparatus tank to remain idle until the apparatus tank is ready for another cycle time.

(7) repeating another cycle for treating more said influent water stream.

8. The method of claim 7 wherein said fine gas bubbles with diameters less than 80 microns are generated by a dissolved gas flotation means requiring the following means in combination:

(1) an enclosed cylindrical pressure vessel means having a tangentially disposed water stream vessel inlet means connected to an inlet pipe means for delivering a water stream into said pressure vessel means, a pump means, a gas injector, a nozzle assembly means and said inlet pipe means cooperating to feed the water stream under conditions to yield a rotating water stream inside said pressure vessel means which rotates at over 2500 rpm; and said pressure vessel means further comprising a gas compressor, a pressure gauge, a safety valve, gas bleed off valve means, plural gas inlet means, a wall mounted porous plate assembly, and a porous center tube, for feeding and monitoring at least one gas into said pressure vessel means, gas flow meter means and regulator means connected to the plural gas inlet means for regulating pressure in said pressure vessel means from 2 atmospheres to 7 atmospheres, and a vessel outlet means, said gas being air, oxygen, nitrogen, helium, carbon dioxide, ozone, chlorine, or combinations thereof;

(2) a pressurized water release assembly means connected to the vessel outlet means of said pressure vessel means and positioned inside a fine bubble chamber means, said pressurized water release assembly means further comprising a pressure reduction valve for allowing said water stream to be depressurized in stages under laminar flow conditions for generating micro-gas bubbles with diameter less than 80 microns in a depressurized water stream;

(3) a water piping system for feeding an untreated water stream or recycling a clarified effluent water into said inlet pipe means.

* * * * *